(12) United States Patent
Hao

(10) Patent No.: US 11,854,439 B1
(45) Date of Patent: Dec. 26, 2023

(54) MOBILE PLATFORM FOR DISPLAYING MULTIMEDIA CONTENT

(71) Applicant: Alvin Hao, Diamond Bar, CA (US)

(72) Inventor: Alvin Hao, Diamond Bar, CA (US)

( * ) Notice: Subject to any disclaimer, the term of this patent is extended or adjusted under 35 U.S.C. 154(b) by 0 days.

(21) Appl. No.: 17/993,786

(22) Filed: Nov. 23, 2022

(51) Int. Cl.
*G09F 21/04* (2006.01)
*G06V 40/10* (2022.01)
*G06Q 30/0251* (2023.01)
*G06V 10/764* (2022.01)
*G06V 10/82* (2022.01)
*G06V 20/52* (2022.01)

(52) U.S. Cl.
CPC ....... *G09F 21/048* (2013.01); *G06Q 30/0251* (2013.01); *G06Q 30/0261* (2013.01); *G06Q 30/0265* (2013.01); *G06V 10/764* (2022.01); *G06V 10/82* (2022.01); *G06V 20/52* (2022.01); *G06V 40/103* (2022.01)

(58) Field of Classification Search
None
See application file for complete search history.

(56) References Cited

U.S. PATENT DOCUMENTS

2019/0087145 A1* 3/2019 Park ................... G06V 40/103
2021/0049772 A1* 2/2021 Buibas ............... G06Q 30/0601

* cited by examiner

*Primary Examiner* — Delomia L Gilliard
(74) *Attorney, Agent, or Firm* — Foley & Lardner LLP

(57) ABSTRACT

The present disclosure relates to systems, methods, non-transitory computer-readable media, and apparatuses relating to a camera, an output device, a locomotion system, and a processing circuit including a processor and a memory, the processing circuit is configured to move a mobile platform system using the locomotion system in a cruise mode within an area, determine, using a camera of the mobile platform system, image or video data of a plurality of individuals within the area while moving in the cruise mode, select a first target individual and a second target individual of the plurality of individuals based on analyzing the image or video data, determine first contextual information of the first target individual and second contextual information of the second target individual based on analyzing the image or video data, determine first characteristic of the first target individual based on the first contextual information and second characteristic of the second target individual based on the second contextual information, determine at least one multimedia content segment based on both the first characteristic of the first target individual and the second characteristic of the second target individual, and cause an output device of the mobile platform system to display while the mobile platform system is in a stop mode, the at least one multimedia content segment.

20 Claims, 13 Drawing Sheets

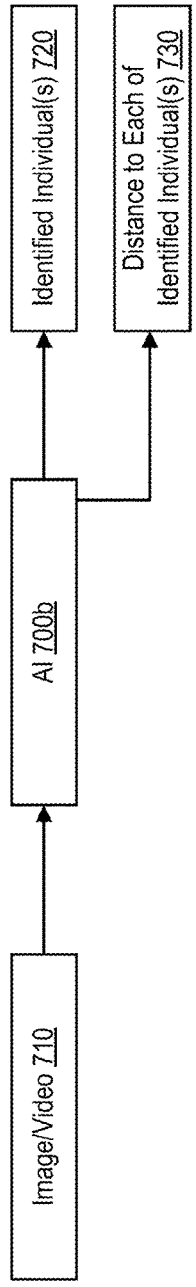
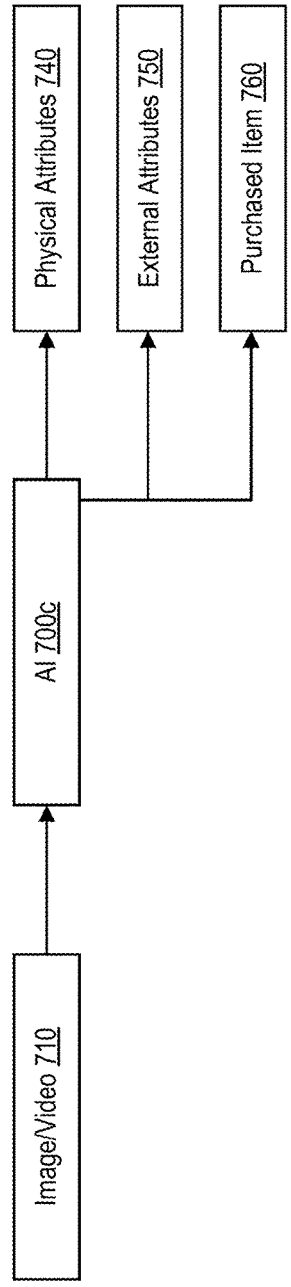
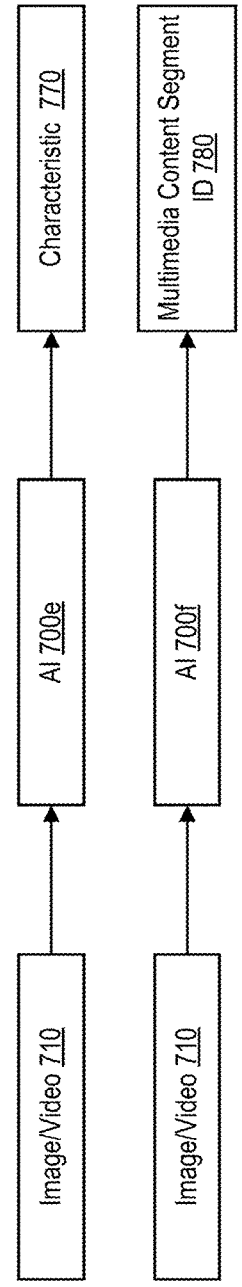

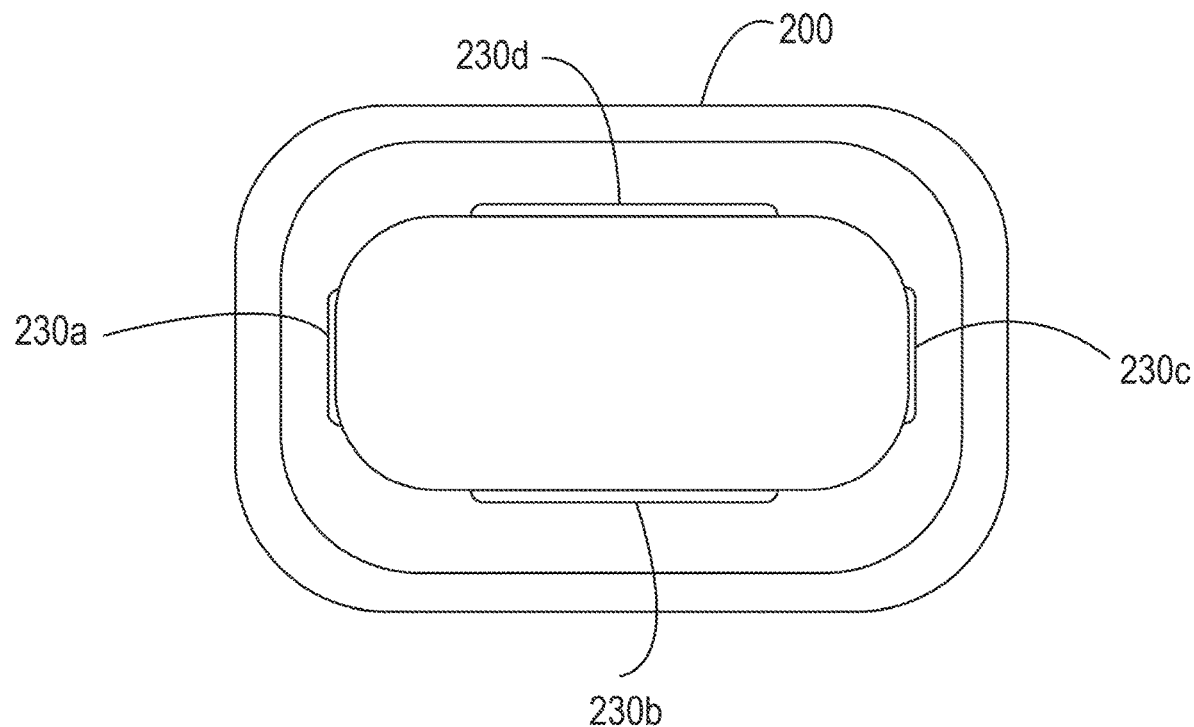
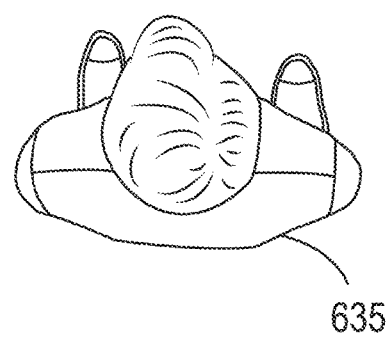
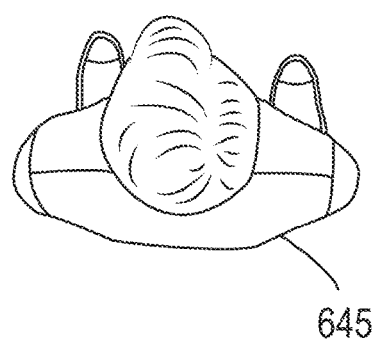
FIG. 11B

MOBILE PLATFORM FOR DISPLAYING MULTIMEDIA CONTENT

TECHNICAL FIELD

The present disclosure relates to a mobile platform for displaying multimedia content.

BACKGROUND

Stationary multimedia platforms such as indoor and outdoor electronic displays, electronic display bill boards, electronic signage, and so on are fixed in a location and cannot provide multimedia content to potential viewers who are remote to the fixed location. Conventional multimedia platforms display predefined, specific multimedia content, sometimes in a predefined sequence, instead of providing multimedia content that is tailored to any specific viewer.

SUMMARY

In some arrangements, a system includes a camera, an output device, a locomotion system, and a processing circuit including a processor and a memory, the processing circuit is configured to move a mobile platform system using the locomotion system in a cruise mode within an area, determine, using a camera of the mobile platform system, image or video data of a plurality of individuals within the area while moving in the cruise mode, select a first target individual and a second target individual of the plurality of individuals based on analyzing the image or video data, determine first contextual information of the first target individual and second contextual information of the second target individual based on analyzing the image or video data, determine first characteristic of the first target individual based on the first contextual information and second characteristic of the second target individual based on the second contextual information, determine at least one multimedia content segment based on both the first characteristic of the first target individual and the second characteristic of the second target individual, and cause an output device of the mobile platform system to display while the mobile platform system is in a stop mode, the at least one multimedia content segment.

In some arrangements, a system, includes a vision system including a camera, at least one Artificial Intelligence (AI), an AI training system, an input device, an output device, a processing circuit including a processor and a memory, the processing circuit implementing the AI, the AI training system, and the processing circuit is configured to: determine, using the camera, image or video data of a plurality of individuals within an area, select a first target individual and a second target individual of the plurality of individuals based on analyzing the image or video data, determine first contextual information of the first target individual and second contextual information of the second target individual based on analyzing the image or video data, determine first characteristic of the first target individual based on the first contextual information and second characteristic of the second target individual based on the second contextual information, determine at least one multimedia content segment based on both the first characteristic of the first target individual and the second characteristic of the second target individual, cause an output device of the mobile platform system to display, the at least one multimedia content segment, receive feedback information using the input device of the mobile platform system, and using the feedback information and metadata associated with the feedback information as training data to train the at least one AI.

In some arrangements, a method includes moving a mobile platform system in a cruise mode within an area, determining, by a camera of the mobile platform system, image or video data of a plurality of individuals within the area while moving in the cruise mode, selecting a first target individual and a second target individual of the plurality of individuals based on analyzing the image or video data, the first target individual and the second target individual are selected using a first AI with a first input of the image or video data, determining first contextual information of the first target individual and second contextual information of the second target individual based on analyzing the image or video data, the first contextual information and the second contextual information are determined using a second AI with a second input of the image or video data, determining first characteristic of the first target individual based on the first contextual information and second characteristic of the second target individual based on the second contextual information, the first characteristic and the second characteristic are determined using a third AI using a third input of the first contextual information and the second contextual information, respectively, determining at least one multimedia content segment based on both the first characteristic of the first target individual and the second characteristic of the second target individual, displaying, by an output device of the mobile platform system while the mobile platform system is in a stop mode, the at least one multimedia content segment, receiving feedback information using an input device of the mobile platform system, and using the feedback information and metadata associated with the feedback information as training data to train the first AI, the second AI, and the third AI.

In some arrangements, moving in the cruise mode within the area includes moving the mobile platform system on a predetermined path within the area. In some arrangements, moving in the cruise mode within the area includes moving the mobile platform system on a first path within the area during a first time interval, moving the mobile platform system on a second path within the area during a second time interval, wherein at least one location along the first path is different from any location on the second path. In some arrangements, in response to selecting the first target individual and the second target individual, moving the mobile platform system in an approach mode toward the first target individual and the second target individual.

In some arrangements, the camera of mobile platform system includes a plurality of cameras facing different directions, and capturing the image or video data of the plurality of individuals within the area while moving in the cruise mode includes capturing, by the plurality of cameras, the image or video data of the plurality of individuals within the area while moving in the cruise mode, wherein the first target individual of the plurality of individuals is captured by a first camera of the plurality of cameras, and the second target individual of the plurality of individuals is captured by a second camera of the plurality of cameras.

In some arrangements, the output device includes a display, the method including orienting the display to face both the first target individual and the second target individual when displaying the at least one multimedia content segment.

In some arrangements, the first contextual information of the first target individual includes at least one of physical attributes of the first target individual, external attributes of the first target individual, and purchased item of the first individual as captured in the image or video data, and the second contextual information of the first second individual includes at least one of physical attributes of the second target individual, external attributes of the second target individual, and purchased item of the second individual as captured in the image or video data.

In some arrangements, a plurality of multimedia content segments are stored in a database, wherein each of the plurality of multimedia content segments includes a plurality of tags, wherein determining the at least one multimedia content segment includes selecting the at least one multimedia content segment by matching first characteristic and second characteristic to the plurality of tags.

In some arrangements, the metadata includes: a length of time associated with the feedback information, a distance between the mobile platform system with each of the first target individual or the second target individual. In some arrangements, the metadata includes: a time of day, a date, and a location of the mobile platform system.

In some arrangements, the feedback information further includes each of the first target individual or the second target individual walking away from the mobile platform system as determined based on analyzing the image or video data. In some arrangements, the feedback information further includes each of the first target individual or the second target individual is looking at the at least one multimedia content segment as determined based on analyzing the image or video data.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 7A is a diagram illustrating a method for determining at least one identified individual, according to various arrangements.

FIG. 7B is a diagram illustrating a method for determining at least one identified individual and the distance from a mobile platform system to each of the at least one identified individual, according to various arrangements.

FIG. 7C is a diagram illustrating a method for determining context information of each target individual, according to various arrangements.

FIG. 7D is a diagram illustrating a method for determining characteristic of each target individual, according to various arrangements.

FIG. 7E is a diagram illustrating a method for determining characteristic of each target individual, according to various arrangements.

FIG. 7F is a diagram illustrating a method for determining multimedia content segment ID, according to various arrangements.

FIG. 11B is a diagram illustrating the mobile platform system and the target individuals, according to some arrangements.

DETAILED DESCRIPTION

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

The arrangements disclosed herein relate to mobile platform systems for displaying multimedia content to one or more individuals. A mobile platform system described herein can be an autonomous vehicle such as an Unmanned Ground Vehicle (UGV), an Unmanned Aerial Vehicle (UAV), Automated Guest Vehicle (AGV), and so on that can move automatically without substantial human intervention. The mobile platform system can include one or more output devices (e.g., at least one display, at least one speaker, or so on) that can output multimedia content to one or more individuals. The mobile platform system can move along a path in a cruise mode (or patrol mode) to detect potential viewers. For example, the mobile platform system can include a sensor (e.g., one or more cameras, one or more Light Detection and Ranging (LiDAR) devices, or so on) configured to detect multiple individuals. In an approach mode, the mobile platform system can select one or more individuals and move toward those individuals and position the mobile platform system in a suitable location/orientation to display the multimedia content to the one or more individuals. In a stop mode, the mobile platform system can hold its current location/orientation while displaying the multimedia content. In a follow mode, the mobile platform system can follow the selected one or more individuals while displaying the multimedia content.

The multimedia content that is displayed to the one or more individuals can be selected using Artificial Intelligence (AI) based on extracted characteristic of each of the one or more selected individuals. The characteristic of each of the one or more selected individuals can be extracted using image of video data that the mobile platform system has captured on the one or more individuals. The one or more individuals who has viewed the multimedia content may indicate, via an input device of the mobile platform system, whether the one or more individuals like the selected multimedia content. The response of the individuals can be used to further train the AI on multimedia content selection.

Figure 1:
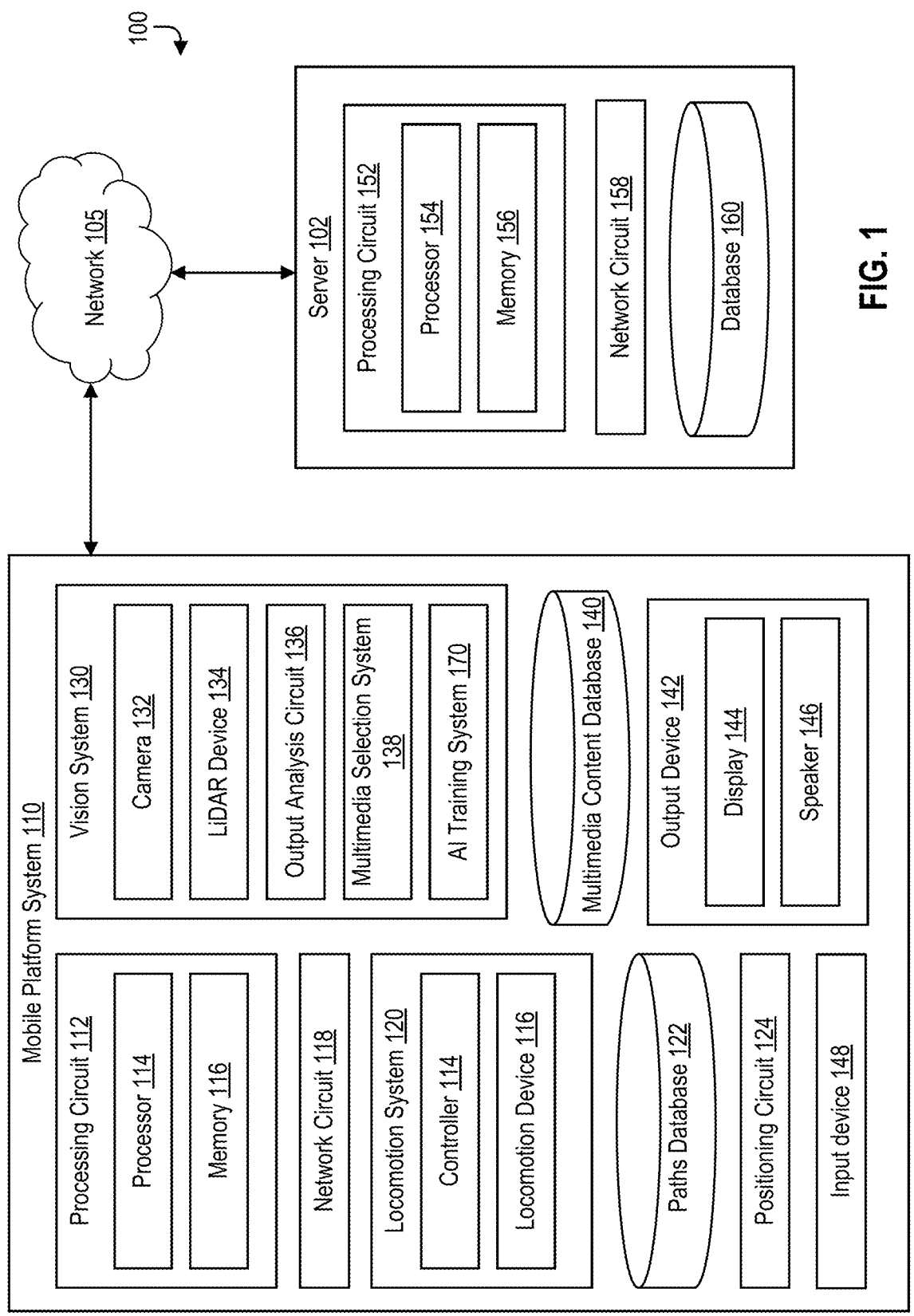
FIG. 1 is a block diagram of a system including a mobile platform system, according to various arrangements.

FIG. 1 is a block diagram 100 of a system including a mobile platform system 110, according to various arrangements. The mobile platform system 110 can be any autonomous vehicle, unmanned vehicle, or self-driving vehicle, such as an UGV, an UAV, a robot, and so on. The mobile platform system 110 is capable of autonomously moving, detecting one or more individuals, and displaying selected multimedia content to those individuals. The server 102 is a backend system that supports the functionalities and activities of the mobile platform system 110. The server 102 is connected to the mobile platform system 110 via a network 105.

The mobile platform system 110 includes a processing circuit 112, which has a processor 114 and the memory 116. The processor 114 can be implemented as a single-chip or multi-chip processor, at least one Digital Signal Processor (DSP), at least one Application Specific Integrated Circuit (ASIC), at least one Field Programmable Gate Array (FPGA), at least one Graphics Processing Unit (GPU), at least one Central Processing Unit (CPU), or other programmable logic device, discrete gate or transistor logic, discrete hardware components, a combination thereof, or so on, as designed to perform the functions described herein. The processor 114 can be a suitable processor, a microprocessor, a group of processors, a combination thereof, or so on. The processor 114 can be implemented as a combination of computing devices, such as a combination of a DSP and a microprocessor, a plurality of microprocessors, one or more microprocessors in conjunction with a DSP core, a combination thereof, or so on. The processor 114 can be used to implement one or more circuits, devices, or elements, shown as blocks of within the mobile platform system 110. For example, the processor 114 can be one or more processors that are shared by multiple circuits, devices, or elements of the mobile platform system 110. The processor 114 can be one or more processors structured to perform or otherwise execute certain operations independent of one or more co-processors. The processor 114 can be two or more processors coupled via a bus to enable independent, parallel, pipelined, or multi-threaded instruction execution. All such variations are intended to fall within the scope of the present disclosure.

The memory 116 stores data and/or computer code for facilitating at least some of the various processes described herein. The memory 116 can include at least one Random Access Memory (RAM), at least one Read-Only Memory (ROM), at least one Non-Volatile RAM (NVRAM), at least one flash memory, at least one hard disk storage, a combination thereof, or so on. The memory 116 includes tangible, non-transient volatile memory or non-volatile memory. The memory 116 can include at least one non-transitory processor readable medium having stored programming logic that, when executed by the processor 114, controls the operations of the mobile platform system 110. Accordingly, the memory 116 may include database components, object code components, script components, or any other type of information structure for supporting the various activities and information structures described herein with respect to the mobile platform system 110.

The network circuit 118 is structured for sending and receiving data over the network 105, for example, to and from the server 102 and one or more other suitable devices. Accordingly, the network circuit 118 includes at least one cellular transceiver (for cellular standards), at least one local wireless network transceiver (e.g., 802.11X, ZigBee, Bluetooth, Wi-Fi, or so on), wired network interface, a combination thereof (e.g., both a cellular transceiver and a Bluetooth transceiver), or the like.

The mobile platform system 110 includes a locomotion system 120. The locomotion system 120 enables the mobile platform system 110 to move autonomously. For example, the locomotion system 120 includes a controller 114 and a locomotion device 116. The locomotion device 116 includes a propulsion device that can move the mobile platform system 110 on land or in air. For example, the propulsion device can include at least one of one or more wheels, one or more tires, one or more tracks, one or more robotic limbs or legs, one or more rotors, as well as at least one of one or more motors or one or more engines configured to drive the same. The controller 114 is configured to control the locomotion device 116 to move the mobile platform system 110 in a certain direction at a certain speed. In that regard, the controller 114 includes suitable processing and memory capabilities, and can be implemented using the processing circuit 112 or a dedicated processing circuit similar to the processing circuit 112.

The mobile platform system 110 includes a paths database 122 that includes one or more paths within an area along which the controller 114 can control the locomotion device 116 to move the mobile platform system 110. The paths stored in the paths database 122 can be predetermined patrol path along which the mobile platform system 110 moves in the cruise mode. A path can include a start location, an end location, and one or more intermediate locations or waypoints. The path can be represented in a map defined by a coordinate system (e.g., a Cartesian coordinate system in 2D or 3D). The coordinates can define the environment (including known fixed objects) of an area within which the mobile platform system 110 is configured to move as well as the start location, end location, and one or more intermediate locations or waypoints. The mobile platform system 110 can periodically determine its current location using the positioning circuit 124 and cross reference the current location against the coordinates on the map to ensure that the mobile platform system 110 stays on path.

In some examples, the path that the mobile platform system 110 follow may not be predetermined and is instead determined ad hoc, using real-time mapping and positioning techniques such as Simultaneous Localization and Mapping (SLAM). In some examples, the environment may include guides such as tapes or paint on the floor that the mobile platform system 110 can follow. For instance, the camera 132 can include a camera facing the ground or floor to continuously or periodically output images or videos of the ground or floor including the guide based on which the controller 114 can drive the locomotion device 116.

The mobile platform system 110 includes a positioning circuit 124 configured to determine a position or location of the mobile platform system 110. For example, the positioning circuit 124 can include one or more of a Global Positioning System (GPS) radio for satellite positioning, Wi-Fi radio (e.g., included as part of the network circuit 118) for Wi-Fi positioning, cellular radio (e.g., included as part of the network circuit 118) for cell tower triangular, combinations thereof, or the like. The positioning circuit 124 can use LiDAR device 134, laser range finder, Laser Distance Sensor (LDS), at least one camera 132 (e.g., at least one range camera, depth camera, or so on), ultrasonic radar sensor, infrared and photocell sensors, and other ranging devices to determine the distance and direction/angle from those sensors to one or more reference points to determine a position of the mobile platform system 110 within an area. The reference points may have a known position within the area, based on which the current position of the mobile platform system 110 can be calculated. For example, the positioning circuit 124 can implement any Time-of-Flight (ToF), image ranging (e.g., triangulation), SLAM real-time mapping and positioning techniques to determine the location of the mobile platform system 110.

The mobile platform system 110 includes a vision system 130 configured to collect data of the surroundings of the mobile platform system 110, determine an output selection of a multimedia content segment using AI, and train the AI using feedback information. As shown, the vision system 130 can include a camera 132, a LiDAR device 134, an output analysis circuit 136, a multimedia selection system 138, and the AI training system 170. The camera 132 can include one or more digital cameras (e.g., high-resolution digital cameras) configured to output digital images or videos of an environment of the mobile platform system 110 and one or more individuals within the environment. The camera 132 can also include at least one range camera, depth camera, or so on use to determine a distance between the camera 132 and a point or an object. The LiDAR device 134 can include at least one LiDAR transmitter and at least one LiDAR receiver configured to output LiDAR data (e.g., a point cloud, a LiDAR-derived image or video, a 2D or 3D LiDAR model, or so on) of an environment of the mobile platform system 110 and one or more individuals within the environment. The output of the camera 132 and the LiDAR device 134 can be used as the data based on which the multimedia content is selected. The output of the camera 132 and the LiDAR device 134 can be used in obstacle avoidance when the mobile platform system 110 is moving.

The output analysis circuit 136 can include suitable processing and memory capabilities to analyze the output (e.g., image, video, LiDAR point cloud, and so on) outputted by the camera 132 and the LiDAR device 134 to select one or more individuals of interest (referred to as target individuals) and to determine one or more characteristics of the target individuals in the manner described herein. The output analysis circuit 136 includes suitable processing and memory capabilities, and can be implemented using the processing circuit 112 or a dedicated processing circuit similar to the processing circuit 112.

The multimedia selection system 138 can include suitable processing and memory capabilities to select the multimedia content to be displayed to the one or more individuals based on the characteristics of the target individuals in the manner described herein. The multimedia selection system 138 includes suitable processing and memory capabilities, and can be implemented using the processing circuit 112 or a dedicated processing circuit similar to the processing circuit 112.

In some examples, one or both of the output analysis circuit 136 and the multimedia selection system 138 can be implemented using suitable AI. The AI can include a classifier that classifies an input into one or more outputs (e.g., classification, categories, and so on). An example of the classifier is a kernel-based classifier, such as but not limited to a Support Vector Machine (SVM), Spectral Regression Kernel Discriminant Analysis (SR-KDA), Deep Neural Networks (DNNs) such as Convolution Neural Networks (CNNs), and so on. For example, the AI can implement computer vision algorithms that can be used to extract the characteristics defining an individual. The AI training system 170 can employ machine learning algorithms to train the AI to provide an appropriate output by building one or more AI models, and based on the feedback information obtained during operations of the mobile platform system 110, further improves the accuracy of the output.

The mobile platform system 110 includes a multimedia content database 140. The multimedia content database 140 is used to store multimedia content segments that can be displayed by the output device 142 to the individuals of interest. Each multimedia content segment can be a suitable video file such as MP4, MOV, WMV, AVI, etc. Each multimedia content segment can be identified by a unique identifier (an alphanumeric string) and one or more tags. The tags can define the multimedia content segment. Examples of tags include content classification. Examples of content classification include advertisement, educational content, notification (e.g., emergency notification), entertainment, coupons, discounts, offers, promotional codes, and so on. The tags or content classification can be selected or defined based on age (e.g., an age range), gender, wealth (middle class, high-net-worth, and so on), height, hobbies (e.g., "loves exercise," "loves reading books," and so on), diet (e.g., vegan, ketogenic, and so on), etc.

The mobile platform system 110 includes an output device 142 which can include any device by which multimedia content can be outputted to any individual adjacent to the mobile platform system 110. Examples of the output device 142 includes a display 144 for outputting images and videos, and a speaker 146 for outputting sound. An example of the display 144 includes a touchscreen, a Liquid Crystal Display (LCD), a Thin Film Transistor LCD (TFT-LCD), a Blue Phase LCD, an electronic papers (e-ink) display, a flexible display, a Light Emitting Diode display (LED), a Digital Light Processing (DLP) display, a Liquid Crystal On Silicon (LCOS) display, an Organic Light-Emitting Diode (OLED) display, an Active-Matrix Organic Light-Emitting Diode (AMOLED) display, a liquid crystal laser display, a Time-Multiplexed Optical Shutter (TMOS) display, a 3D or stereoscopic display, and/or the like. Examples of 3D displays can include, for example, stereoscopy, polarization filters, active shutters, autostereoscopy, and/or the like.

The mobile platform system 110 includes an input device 148 which can include any device by which an individual adjacent to the mobile platform system 110 can input information and data. Examples of the input device 148 can include a mouse, keyboard, microphone, buttons, dials, etc. In some examples, both the input device 148 and the output device 142 can include the same touchscreen.

The mobile platform system 110 can include a housing that encloses at least partially the components of the mobile platform system 110 described herein. In some examples, the output device 142 and the input device 148 may have its user interactive interfaces (e.g., screens, touch screens, speakers, keyboard, mouse, etc.) exposed from the housing. In some examples, the vision system 130 may have its sensor components (e.g., camera lens, LiDAR transmitter and receiver, etc.) exposed from the housing.

The mobile platform system 110 can be communicably coupled or connected to the server 102 via the network 105. Examples of the network can include any suitable wired or wireless network, such as the Ethernet, wireless Local Area Network (LAN), Wide Area Network (WAN), wireless cellular networks (such as 4G, LTE, 5G, 6G, etc.), Personal Communications Service (PCS), 802.11X, ZigBee, Bluetooth, Wi-Fi, and so on. The network 105 is structured to permit the exchange of data, values, instructions, messages, and the like between the mobile platform system 110 and the server 102.

The server 102 includes a processing circuit 152 having a processor 154 and a memory 156. The processor 154 can be implemented as a single-chip or multi-chip processor, at least one DSP, at least one ASIC, at least one FPGA, at least one GPU, at least one CPU, or other programmable logic device, discrete gate or transistor logic, discrete hardware components, a combination thereof, or so on, as designed to perform the functions described herein. The processor 154 can be a suitable processor, a microprocessor, a group of processors, a combination thereof, or so on. The processor 154 can be implemented as a combination of computing devices, such as a combination of a DSP and a microprocessor, a plurality of microprocessors, one or more microprocessors in conjunction with a DSP core, a combination thereof, or so on. The processor 154 can be used to implement one or more circuits, devices, or elements, shown as blocks of within the server 102. For example, the processor 154 can be one or more processors that are shared by multiple circuits, devices, or elements of the server 102. The processor 154 can be one or more processors structured to perform or otherwise execute certain operations independent of one or more co-processors. The processor 154 can be two or more processors coupled via a bus to enable independent, parallel, pipelined, or multi-threaded instruction execution. All such variations are intended to fall within the scope of the present disclosure.

The memory 156 stores data and/or computer code for facilitating at least some of the various processes described herein. The memory 156 can include at least one RAM, at least one ROM, at least one NVRAM, at least one flash memory, at least one hard disk storage, a combination thereof, or so on. The memory 156 includes tangible, non-transient volatile memory or non-volatile memory. The memory 156 can include at least one non-transitory processor readable medium having stored programming logic that, when executed by the processor 156, controls the operations of the server 102. Accordingly, the memory 156 may include database components, object code components, script components, or any other type of information structure for supporting the various activities and information structures described herein with respect to the server 102.

In some examples, the processor 154 can be suitable cloud computing processors, cores, and so on, and the memory 156 can include cloud storage and network storage devices. Accordingly, the processing circuit 152 can be implemented using datacenters that can provide processing and storage capabilities. In some examples, the processing circuit 152 can offload processing and storage capabilities from one or more of the controller 114, the positioning circuit 124, the output analysis circuit 136, and the multimedia selection system 138. For example, the processing circuit 152 can receive input data to those components from the vision system 130 via the network 105, generate the corresponding output, and send the output to the mobile platform system 110.

The network circuit 158 is structured for sending and receiving data over the network 105, for example, to and from the mobile platform system 110 and one or more other suitable devices. Accordingly, the network circuit 158 includes at least one cellular transceiver (for cellular standards), at least one local wireless network transceiver (e.g., 802.11X, ZigBee, Bluetooth, Wi-Fi, or so on), wired network interface, a combination thereof (e.g., both a cellular transceiver and a Bluetooth transceiver), or the like.

In some examples, the database 160 can be used to store one or more paths, and can send updates to the paths, e.g., new paths not previously stored in the paths database 122, to the paths database 122. In some examples, the database 160 can be used to store one or more multimedia content segments, and can send updates to the multimedia content segments, e.g., new multimedia content segments not previously stored in the multimedia content database 140, to the multimedia content database 140. In some example, the mobile platform system 110 does not include the multimedia content database 140, and the server 102 can stream any selected multimedia content segment to the mobile platform system 110 via the network 105, after such multimedia content segment is selected using the multimedia selection system 138 or the processing circuit 152.

Figure 2:
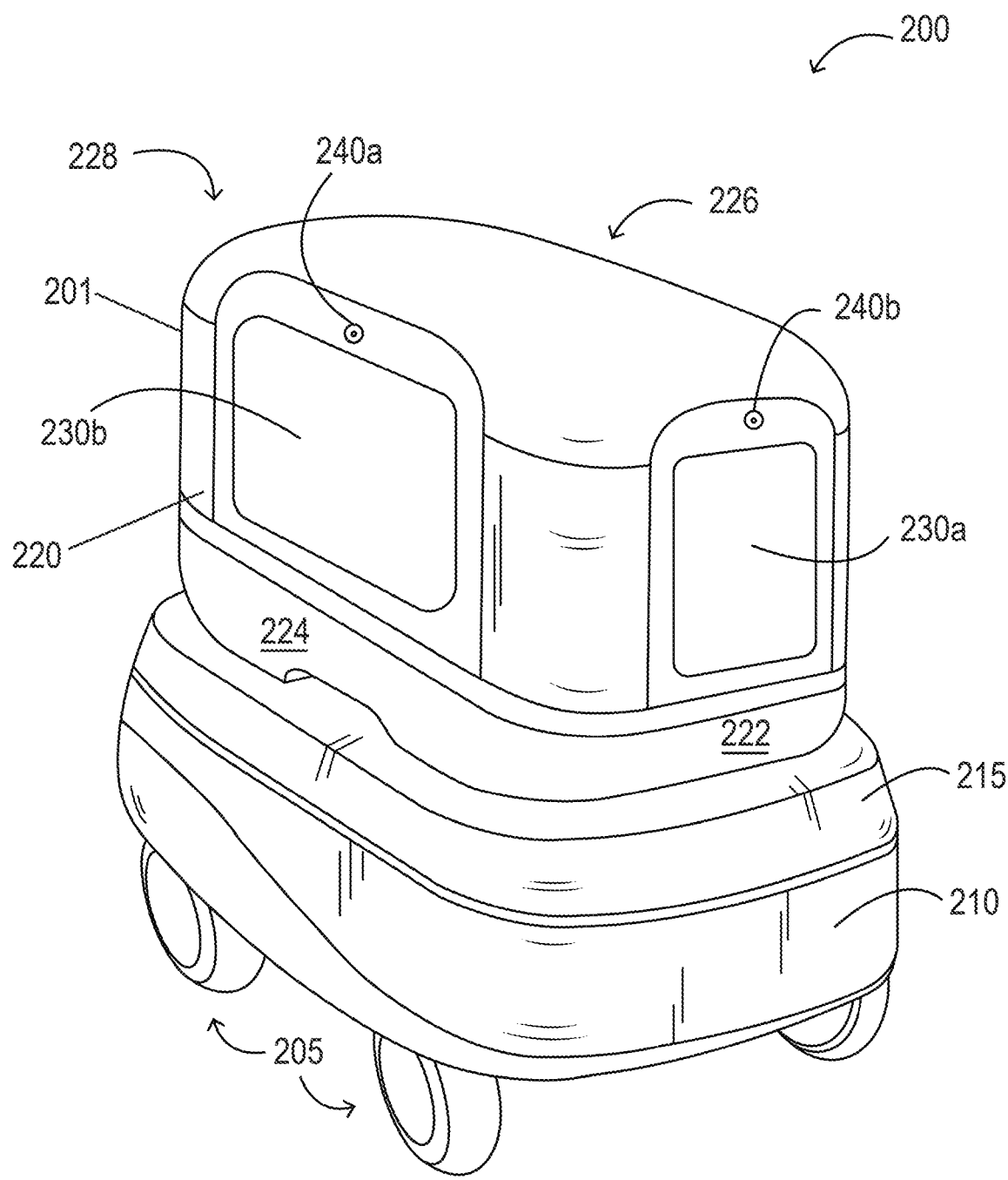
FIG. 2 shows a perspective view of a mobile platform system, according to some arrangements.

FIG. 2 shows a perspective view of a mobile platform system 200, according to some arrangements. The mobile platform system 200 is an example implementation of the mobile platform system 100. The mobile platform system 200 is shown to include a housing 201 that includes a lower portion 210 and an upper portion 220. The lower portion 210 can house components such as the locomotion device 116, shown as tires 205 driven by suitable a motor or an engine (not shown). The controller 114 can drive the tires 205 to position the mobile platform system 200 at any desired location and orientation. The upper portion 220 is shown to has faces 222, 224, 226, and 228. The face 222 is deemed to be the front face as the forward direction of motion of the mobile platform system 200 is the direction normal to the face 222. The face 228 may be a back face. The faces 224 and 226 may be side faces. The mobile platform system 200 may have other components (e.g., the LiDAR device 134) not shown in view.

The face 222 may include a touchscreen 230a and a camera 240a. The face 224 may include a touchscreen 230b and a camera 240b. The touchscreens 230a and 230b can be example implementations of the displayer 144 and the input device 148. The cameras 240a and 240b are example implementations of the camera 132. As shown, the cameras 240a and 240b are located along a vertical axis that traverses the middle of the touchscreens 230a and 230b, respectively, separating the touchscreens 230a and 230b into even halves. This allows the cameras 240a and 240b to have Fields-of-View (FoVs) that can cover any individual who is viewing the content displayed on the touchscreens 230a and 230b, respectively. Although the cameras 240a and 240b are shown to be located above the touchscreens 230a and 230b, respectively, a camera located on the same face of the upper portion 220 as a touch screen can be arranged to be below, on the side of, or adjacent (e.g., within 1 cm, 5 cm, 10 cm, or 20 cm) to the touch screen. While two cameras 240a and 240b and two touchscreens 230s and 230b are shown in view in FIG. 2, the upper portion 220 may include a camera and a touchscreen on each side of the faces 222, 224, 226, and 228, to enabling displaying content to individuals and to capture images and videos of individuals located around 360° or near 360° of the mobile platform system 200. In some examples, the upper portion 220 may a camera and a touchscreen on one or three sides of the upper portion 220. The camera 240a being located on the front face 222 allow the controller 114 to use the images and videos generated using the camera 240a for obstacle avoidance.

In some examples, a middle portion 215 is coupled to the upper portion 220 and the lower portion 210. The middle portion 215 may be fixedly attached to one of the upper portion 220 and the lower portion 210 and rotatably attached to the other one of the upper portion 220 and the lower portion 210. A motor, gear, or hydraulics may be coupled to the middle portion 215 to rotate the middle portion 215 about the upper portion 220 and the lower portion 210, thus causing the upper portion 220 to rotate about the lower portion 210 about an axis of the middle portion 215. For example, a spur gear or traverse gear in the bottom portion 210 engages an internal gear lining the inside of the middle portion 215 fixedly attached to the upper portion 220, such that turning the spur gear rotates the middle portion 215 and the upper portion 220 on the lower portion 210. By rotating the upper portion 220 to rotate about the lower portion 210, the cameras 240a and 240b and the touchscreens 230a and 230b can also rotate about the axis, which is useful for adjusting the viewing angles of the touchscreens 230a and 230b and the camera angles of the cameras 240a and 240b to follow or track the selected target individuals to whom multimedia content segments may be displayed.

Figure 3:
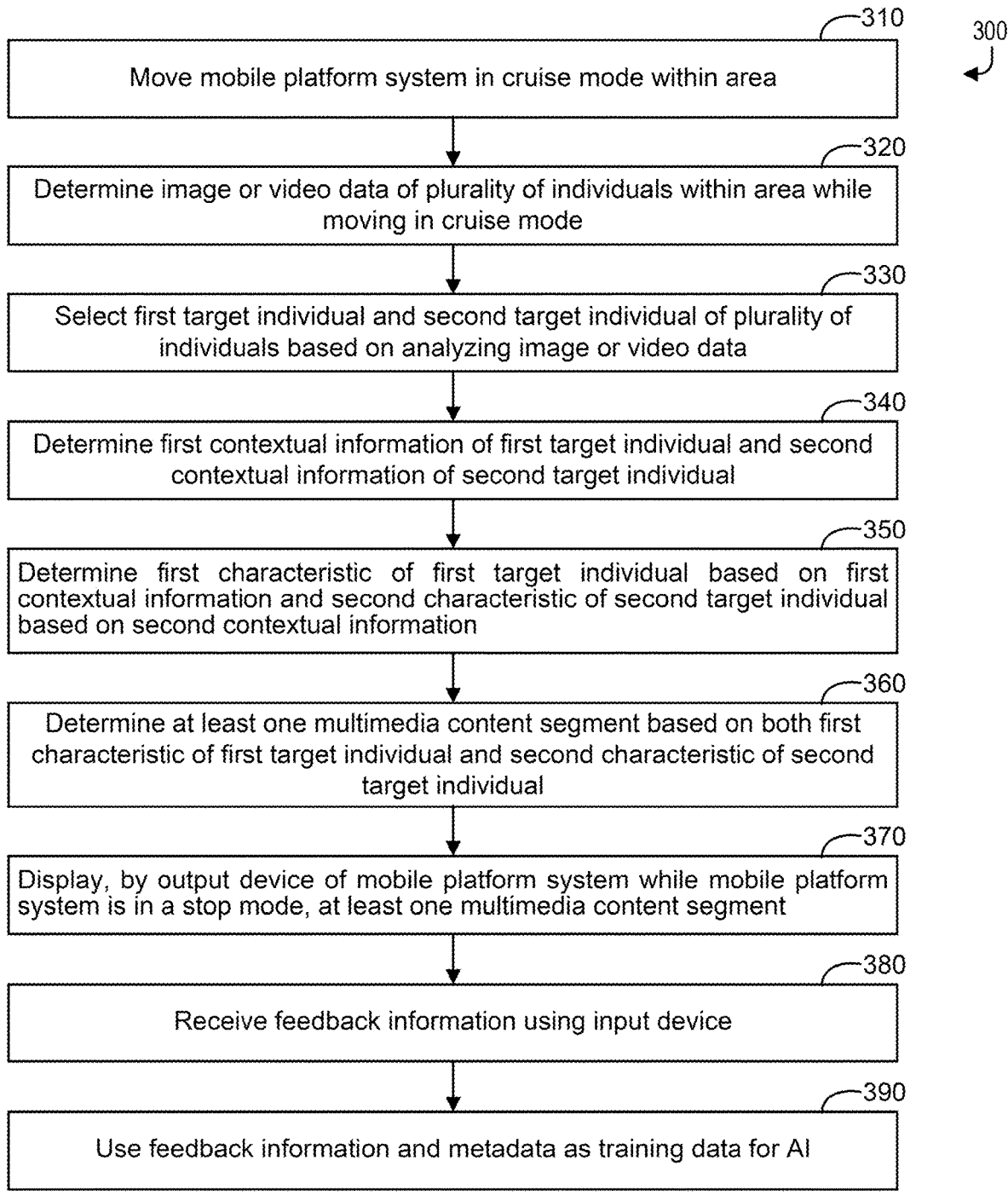
FIG. 3 is a method for operating a mobile platform for displaying multimedia content segments to at least one individual, according to some arrangements.

FIG. 3 is a method 300 for operating a mobile platform system for displaying multimedia content segments to at least one individual, according to various arrangements. Referring to FIGS. 1-3, the method 300 can be performed by the system 100. The mobile platform system can be the mobile platform system 100 or 200.

At 310, the mobile platform system moves in a cruise mode within an area. The area can be a mall, a supermarket, a plaza, etc. In some examples, the area may have enclosure (e.g., walls, fence, etc.). In some examples, the mobile platform system can move in the cruise mode according to at least one predetermined path (e.g., a map defining at least one predetermined path) stored in the paths database 122 or the database 160. The controller 114 or the processing circuit 152 can drive the locomotion device 116 to move within the area in the cruise mode.

Figure 4:
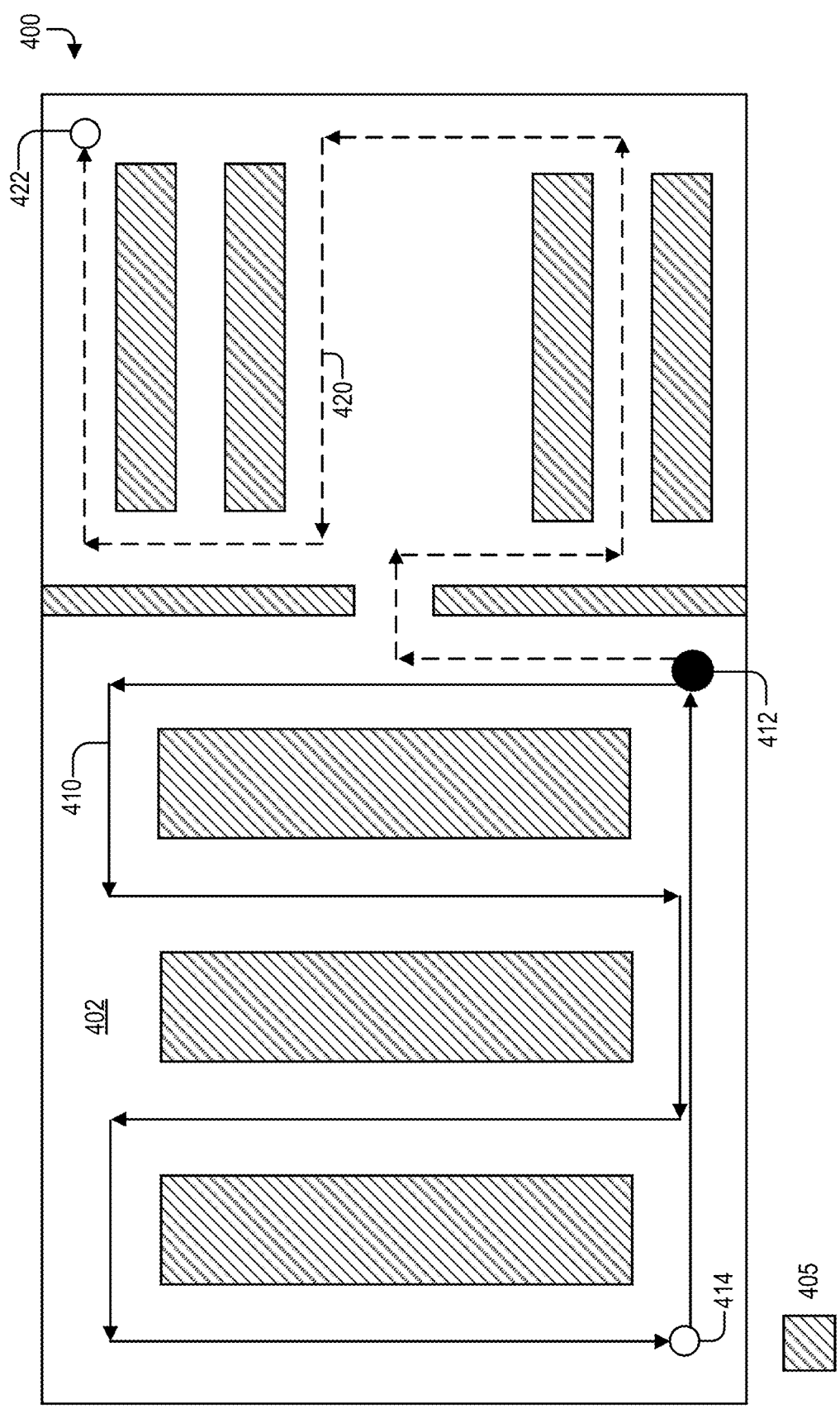
FIG. 4 shows example paths along which the mobile platform system can move, according to some arrangements.

FIG. 4 shows example paths 410 and 420 along which the mobile platform system can move, according to some arrangements. The paths 410 and 420 can be defined in a map 400. The map 400 includes known fixed obstacles 405, which can be walls, poles, elevations, cabinets, equipment, and so on. The paths 410 and 420 steer clear of the known fixed obstacles 405. The path 410 is defined by a start position 412 and an end position 414, and one or more intermediate locations or waypoints. The path 420 is defined by the start position 412 and an end position 422, and one or more intermediate locations or waypoints. The intermediate locations can be located a given incremental distance from the previous intermediate locations of the path or at vertices of the path (e.g., where the path turns). The controller 114 can drive the locomotion device 116 to move along the path 410 or 420 based on the current location (detected using the positioning circuit 124) and one or more known reference locations or features. The known reference locations or features can be a point or area on one of the obstacles 405 (e.g., walls) with distinctive feature having distinctive color, shape, etc. for easy recognition upon image, video, or LiDAR point cloud analysis. The paths 410 and 420, the start position 412, the end positions 414 and 422, and the known fixed obstacles 405 can be defined by suitable coordinates in a coordinate system (e.g., Cartesian coordinates) of the map 400.

Figure 5:
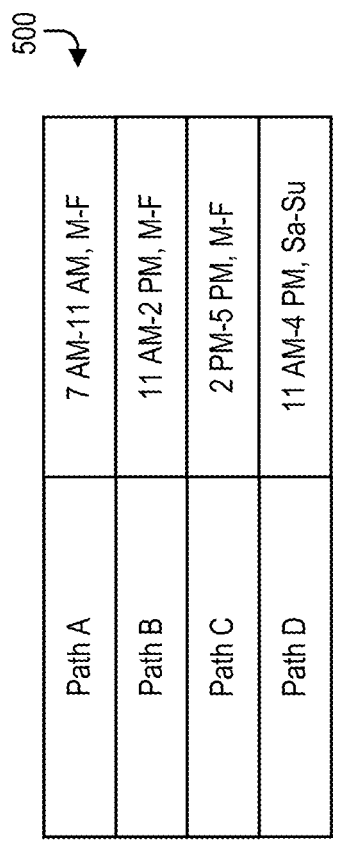
FIG. 5 is a table showing a schedule of paths of a mobile platform system, according to some arrangements.

In some examples, the controller 114 or the processing circuit 152 can select to move along one of multiple paths based on certain conditions such as time of day. FIG. 5 is a table 500 showing a schedule of paths of a mobile platform system, according to various arrangements. In table 500, the mobile platform system selects Path A (e.g., the path 410) during 7 AM to 11 AM, Monday through Friday, Path B (e.g., the path 420) during 11 AM to 2 PM, Monday through Friday, Path C during 2 PM to 5 PM, Monday through Friday, Path D during 11 AM to 4 PM, Saturday and Sunday. This allows the predetermined maps to be determined based on foot traffic. For example, each path during the corresponding time interval may traverse through locations with the highest foot traffic. Therefore, moving in the cruise mode within the area includes moving the mobile platform system on a first path within the area during a first time interval and moving the mobile platform system on a second path within the area during a second time interval, where at least one location along the first path is different from any location on the second path.

In some examples, the path that the mobile platform system follows as well as the map of the environment can be determined by the controller 114 or the processing circuit 152 using real-time mapping and positioning techniques such as SLAM techniques based on the output from the positioning circuit 124 (e.g., the LiDAR device 134, laser range finder, LDS, at least one camera 132 (e.g., at least one range camera, depth camera, or so on), ultrasonic radar sensor, infrared and photocell sensors, and other ranging devices.

In some examples, the environment may include guides such as tapes or paint on the floor that the mobile platform system 110 can follow using the camera 132 or the LiDAR device 134. In some examples, the path in the environment may be defined by a track located on a floor, wall, or ceiling of the area, such that the controller 114 can drive the locomotion device 116 (e.g., wheels) along the track.

At 320, a camera (e.g., the camera 132 or one or more of the cameras 240a and 240b) determines (e.g., generates) image or video data of a plurality of individuals within the area while the mobile platform system is moving in the cruise mode. Each camera of the mobile platform system can continuously or periodically generate image or video data within the FoV of the camera while the mobile platform system is moving in the cruise mode. In the examples in which the mobile platform system has multiple cameras configured, arranged, positioned, or orientated to face different directions (e.g., the cameras 240a and 240b), capturing the image or video data of the plurality of individuals within the area while moving in the cruise mode includes capturing, by the multiple cameras, the image or video data of the plurality of individuals within the area while moving in the cruise mode. The first target individual of the multiple individuals is captured by a first camera of the multiple cameras. The second target individual of the plurality of individuals is captured by a second camera of the multiple cameras. In some examples, both the first target individual and the second target individual are captured by the same camera, e.g., within a same image or frame of a video.

The LiDAR device 134 can determine (e.g., generate) LiDAR output (e.g., point cloud, a LiDAR-derived image or video, a 2D or 3D LiDAR model, or so on) of a plurality of individuals within the area while the mobile platform system is moving in the cruise mode. In some examples, the LiDAR device 134 can continuously or periodically generate LiDAR output within the FoV or target area of the LiDAR device 134 while the mobile platform system is moving in the cruise mode. The camera and/or the LiDAR device 134 can be rotated about a vertical axis to change or increase the FoV and angle of the camera and/or the LiDAR device 134 while the mobile platform system is moving in the cruise mode. In the examples in which the mobile platform system has multiple LiDAR devices configured, arranged, positioned, or orientated to face different directions, generating the LiDAR output of plurality of individuals within the area while moving in the cruise mode includes generating using the multiple LiDAR devices the LiDAR output of the plurality of individuals within the area while moving in the cruise mode. The first target individual of the multiple individuals is captured by a first LiDAR device of the multiple LiDAR devices. The second target individual of the multiple individuals is captured by a second LiDAR device of the multiple LiDAR devices. In some examples, both the first target individual and the second target individual are captured by the same LiDAR device, e.g., within a same point cloud.

At 330, at least one target individual (e.g., a first target individual and a second target individual) of the plurality of individuals is selected based on analyzing the image or video data. For example, the output analysis circuit 136 can receive the image or video data which is the output from the camera 132 and analyze the same, to identify the at least one target individual from a plurality of individuals.

Figure 6A:
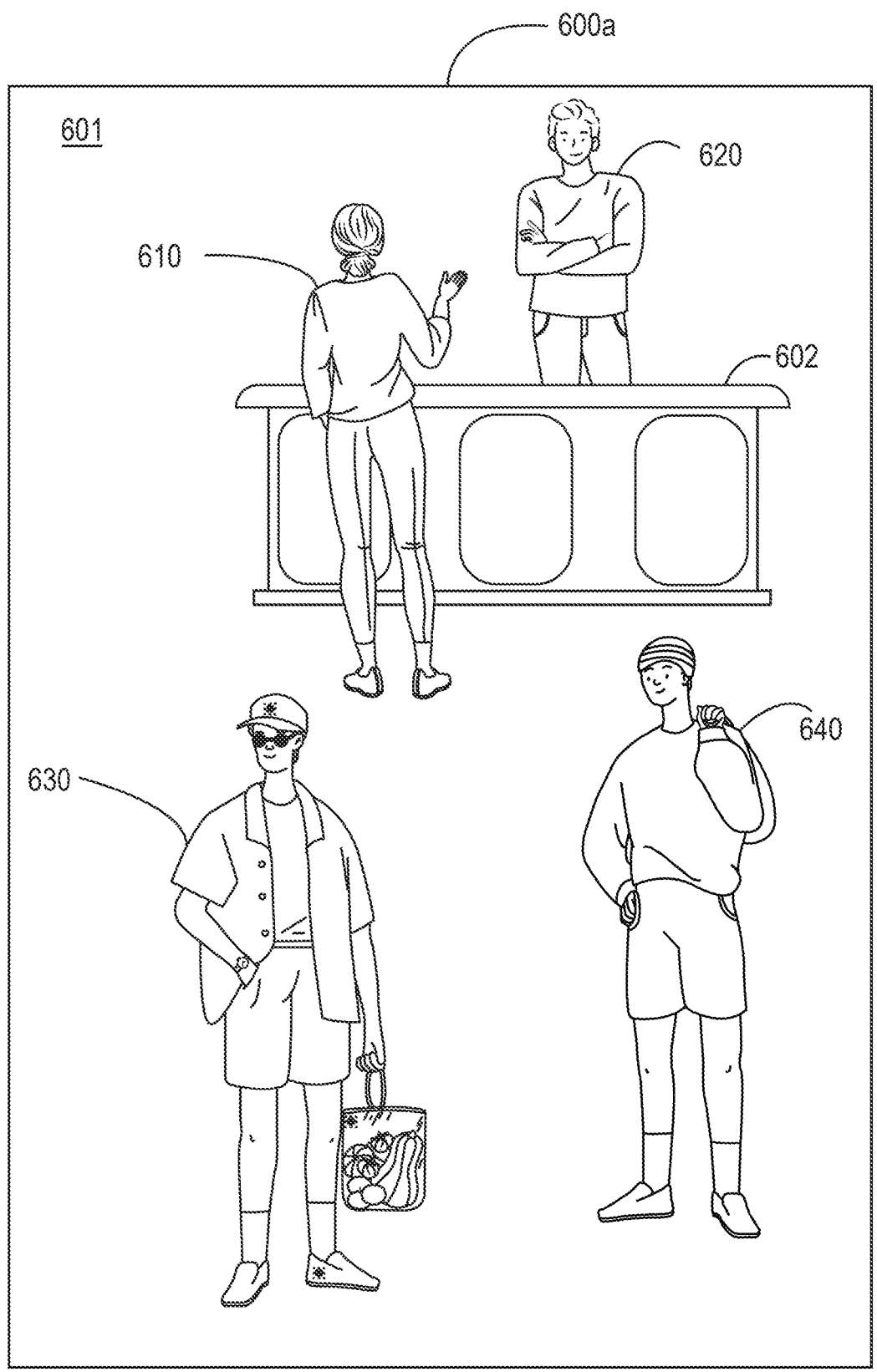
FIG. 6A is an example digital image or a frame of a digital video generated by the camera of the mobile platform system, according to various arrangements.

FIG. 6A is an example digital image 600a generated by the camera 132 of the mobile platform system 110, according to various arrangements. The digital image 600a can be a frame of a digital video generated by the camera. As shown, the image 600a captures a portion of the area 601 within which the mobile platform system 110 moves, at least one object 602 within the area, and one or more individuals (e.g., the plurality of individuals 610, 620, 630, and 640). The object 602 can be an obstacle 405.

Figure 6B:
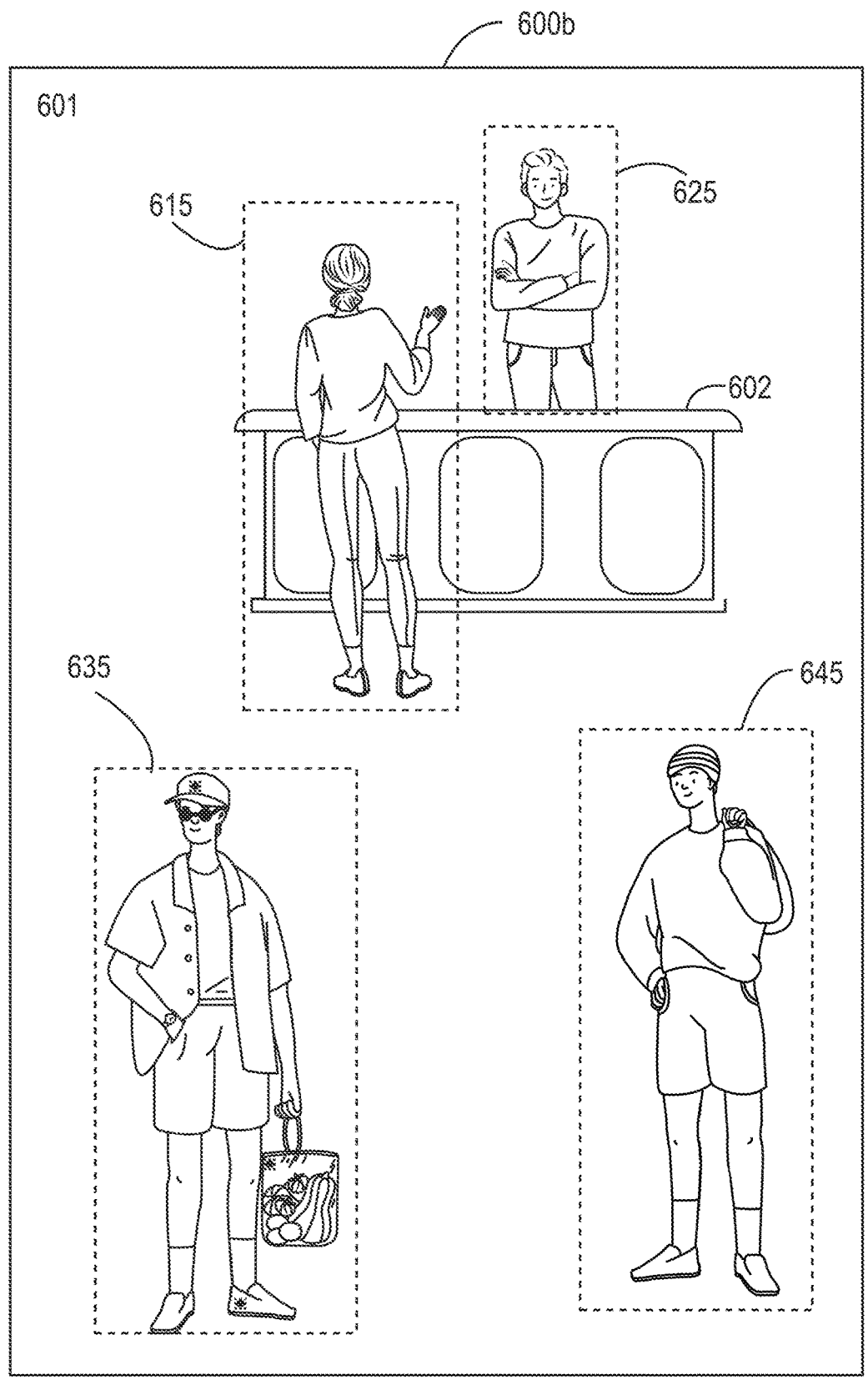
FIG. 6B is an example digital image or a frame of a digital video analyzed by the output analysis circuit of the mobile platform system, according to various arrangements.

FIG. 6B is an example digital image 600b analyzed by the output analysis circuit 136 of the mobile platform system 110, according to various arrangements. The digital image 600b is the same as the digital image 600a. For example, the output analysis circuit 136 can determined from the image 600a identified individuals 615, 625, 635, and 645. The output analysis circuit 136 can implement AI (e.g., the AI 700a, 700b) to identify the individuals 610, 620, 630, and 640 in order to output the identified individuals 615, 625, 635, and 645.

FIG. 7A is a diagram illustrating a method for determining at least one identified individual 720 (e.g., the plurality of individuals), according to various arrangements. The input image/video 710 to the AI 700a includes the digital image (e.g., the digital image 600a) or digital video (a frame of which is the digital image 600a), and the output from the AI 700a includes the identified individuals 720 (e.g., 615, 625, 635, and 645).

The AI 700a can perform object detection (e.g., human detection) and classification using machine learning and computer vision, where the AI 700a receives the image/video 710 outputted by the camera 132 and outputs objects that are classified to be human (e.g., the identified individuals 615, 625, 635, and 645), referred to as the identified individuals 720. In some examples, the AI 700a can include OpenCV, Tensorflow, or another suitable AI system that uses Histograms of Oriented Gradients (HOG) or Haar Cascades for human detection. In some examples, the AI 700a can include one or more DNNs such as CNNs implemented by OpenCV, Tensorflow, or another suitable AI system for image classification, where the class of interest includes humans. The AI 700a can use pre-trained models to implement the classification. The AI 700a can also be trained or further trained by the AI training system 170 using supervised or unsupervised training to identify humans.

In some examples, the output analysis circuit 136 can select at least one target individual from the identified individuals 610, 620, 630, and 640 to whom the multimedia content is displayed. In some examples, at least one target individual can include all identified individuals 610, 620, 630, and 640, given that the image/video 710 cannot capture any individual completely or substantially obstructed by another object (e.g., the object 602) or obstacle (e.g., obstacle 405). In some examples, at least one target individual can include one or more random ones of the identified individuals 610, 620, 630, and 640. In some examples, the output analysis circuit 136 can select at least one target individual from the identified individuals 610, 620, 630, and 640 that is looking at a touchscreen adjacent to the camera that is capturing the digital image 600a. For example, the output analysis circuit 136 can employ suitable eye-tracking algorithms such as that described in Kar et al., A Review and Analysis of Eye-Gaze Estimation Systems, Algorithms and Performance Evaluation Methods in Consumer Platforms, IEEE (August, 2017), to analyze the video and images outputted by the camera 132 to determine the location where the eyes of the identified individuals 610, 620, 630, and 640 are looking. For example, the identified individuals 620 and 640 are selected as they are looking at the touchscreen.

In some examples, the output analysis circuit 136 can select a number (e.g., 1, 2, 3, 4, or so on) of the identified individuals 610, 620, 630, and 640 who are closest to the mobile platform system 110 to be the at least one target individual. The camera 132 can also include at least one range camera, depth camera, or so on use to determine the distance between the camera 132 and a point or an object, such as each of the identified individuals 610, 620, 630, and 640. The distance between the identified individuals 610, 620, 630, and 640 and the mobile platform system 110 can also be determined using the positioning circuit 124 (e.g., the LiDAR device 134, laser range finder, LDS, ultrasonic radar sensor, infrared and photocell sensors, and other ranging devices). Based on the distance between the mobile platform system 110 and each of the identified individuals 610, 620, 630, and 640, the number of the identified individuals 610, 620, 630, and 640 with the shortest distances is selected.

For example, the output analysis circuit 136 can determined from the image 600a using AI the distance between mobile platform system 110 and each of the identified individuals 610, 620, 630, and 640, in addition to the identified individuals 615, 625, 635, and 645 themselves. FIG. 7B is a diagram illustrating a method for determining at least one identified individual 720 (e.g., the plurality of individuals) and the distance 730 from the mobile platform system 110 to each of the at least one identified individual 720, according to various arrangements. The input image/video 710 to the AI 700b includes the digital image (e.g., the digital image 600a) or digital video (a frame of which is the digital image 600a), and the output from the AI 700b includes the identified individuals 720 (e.g., 615, 625, 635, and 645) and the distance 730 from the mobile platform system 110 to each of the at least one identified individual 720. The identified individuals 720 can be determined using suitable methods such as those described relative to FIG. 7A. For example, the AI 700b can include at least one DNN such as a CNN that uses suitable object localization techniques to determine the location of each identified individual with a bounding box (e.g., as shown in FIG. 6B). The AI 700b can infer that the larger the area of the bounding box or the greater the height of the bounding box can indicate that an identified individual (e.g., the individuals 635 and 645) within such bounding box is closer to the mobile platform system 110 than another individual (e.g., the individuals 615 and 625) associated with a smaller area of the bounding box or shorter height of the bounding box.

In some arrangements, the output analysis circuit 136 can determine that the distances between the mobile platform system 110 and the identified individuals (or a number of the identified individuals above a threshold percentage such as 70%, 80%, 90%) are each greater than a predetermined threshold. For example, the output analysis circuit 136 can determine that the area or height of the bounding box of each of the identified individuals 615, 625, 635, and 645 or each of the number of the identified individuals above the threshold percentage is less than an area or height threshold. In response, the controller 114 can drive the locomotion device 116 to move in the direction of the identified individuals 615, 625, 635, and 645. The direction can be determined by the output analysis circuit 136 to be the same as the direction in which the camera 132 is currently oriented to face. The direction can be a dynamic, changing direction in which the identified individuals or a number of the identified individuals above a threshold percentage (e.g., over 50%, 70%, and so on) of the originally detected identified individuals remains in the PoV of frame of the camera 132.

In some examples, multiple target individuals, such as the first target individual (e.g., the identified individual 635) and the second target individual (e.g., the identified individual 645), can be selected from multiple (e.g., three or more identified individuals 615, 625, 635, and 645) detected in an image or video.

In some examples, in response to selecting the first target individual and the second target individual, the controller 114 drives the locomotion device 116 to move the mobile platform system in an approach mode toward the first target individual and the second target individual. For example, the digital image 600a based on which the first and the second target individuals 635 and 645 is selected is captured by the camera 230a, which is the located on the face 222 deemed to be the front face as the forward direction of motion of the mobile platform system 200 is the direction normal to the face 222. The controller 114 drives the locomotion device 116 to continue moving forward in the direction of motion and adjust the direction in order to maintain the first and the second target individuals 635 and 645 within the FoV, image, or video frame of the camera 230a. In the example in which a camera located on a face different from the front face captures the image or video based on which one or more target individuals are selected, the controller 114 drives the locomotion device 116 to move the mobile platform system in an approach mode toward the one or more selected target individuals by moving in a direction in which the camera is pointing and adjust the direction in order to maintain the one or more target individuals within the FoV, image, or video frame of that camera.

At 340, context information of each of the at least one target individual is determined based on analyzing the image or video data. For example, first contextual information of the first target individual and second contextual information of the second target individual can be determined. In some examples, the context information of a target individual includes the physical attributes of the target individual, the external attributes of the target individual, and purchased item of the target individual. The first contextual information of the first target individual includes at least one of physical attributes of the first target individual, external attributes of the first target individual, and purchased item of the first individual as captured in the image or video data determined at 320. The second contextual information of the second target individual includes at least one of physical attributes of the second target individual, external attributes of the second target individual, and purchased item of the second individual as captured in the image or video data determined at 320.

FIG. 7C is a diagram illustrating a method for determining context information of each target individual, according to various arrangements. For example, the output analysis circuit 136 can implement AI 700c, where the input image/video 710 to the AI 700c includes the digital image or digital video, and the output from the AI 700c includes the context information that includes at least the physical attributes 740, the external attributes 750, and the purchased item 760. The physical attributes 740 of the target individual includes one or more of age, gender, height, weight, face, hair style, hair length, hair color, and so on of the target individual. The external attributes 750 the target individual includes one or more of clothing, hat, shoes, belts, tie, jewelry, and so on, particular brands or styles thereof, as worn by the target individual. The purchased items 760 of the target individual includes one or more objects such as merchandise (e.g., clothing, electronics, tools, etc.), groceries (specific types of food, including meat, vegetables, sauces, toiletries, drugs, etc.), packaging, boxes, and so on held by the target individual or placed in a shopping cart adjacent to the target individual.

For example, the AI 700c can implement at least one suitable object detection, object classification, or object recognition algorithms to identify and classify objects captured in the image/video 710 that is worn or carried by each target individual. The object worn by the target individual can be an external attribute 750. The object carried by the target individual can be a purchased item 760. The AI 700c can include one or more DNN such as CNNs implemented by OpenCV, Tensorflow, or another suitable AI system for image classification, where the class of interest includes various classes of the physical attributes 740, external attributes 750, and purchased items 760 as described herein. The AI 700c can use pre-trained models to implement the classification. The AI 700c can also be trained or further trained by the AI training system 170 using supervised or unsupervised training to identify the context information.

Figure 8:
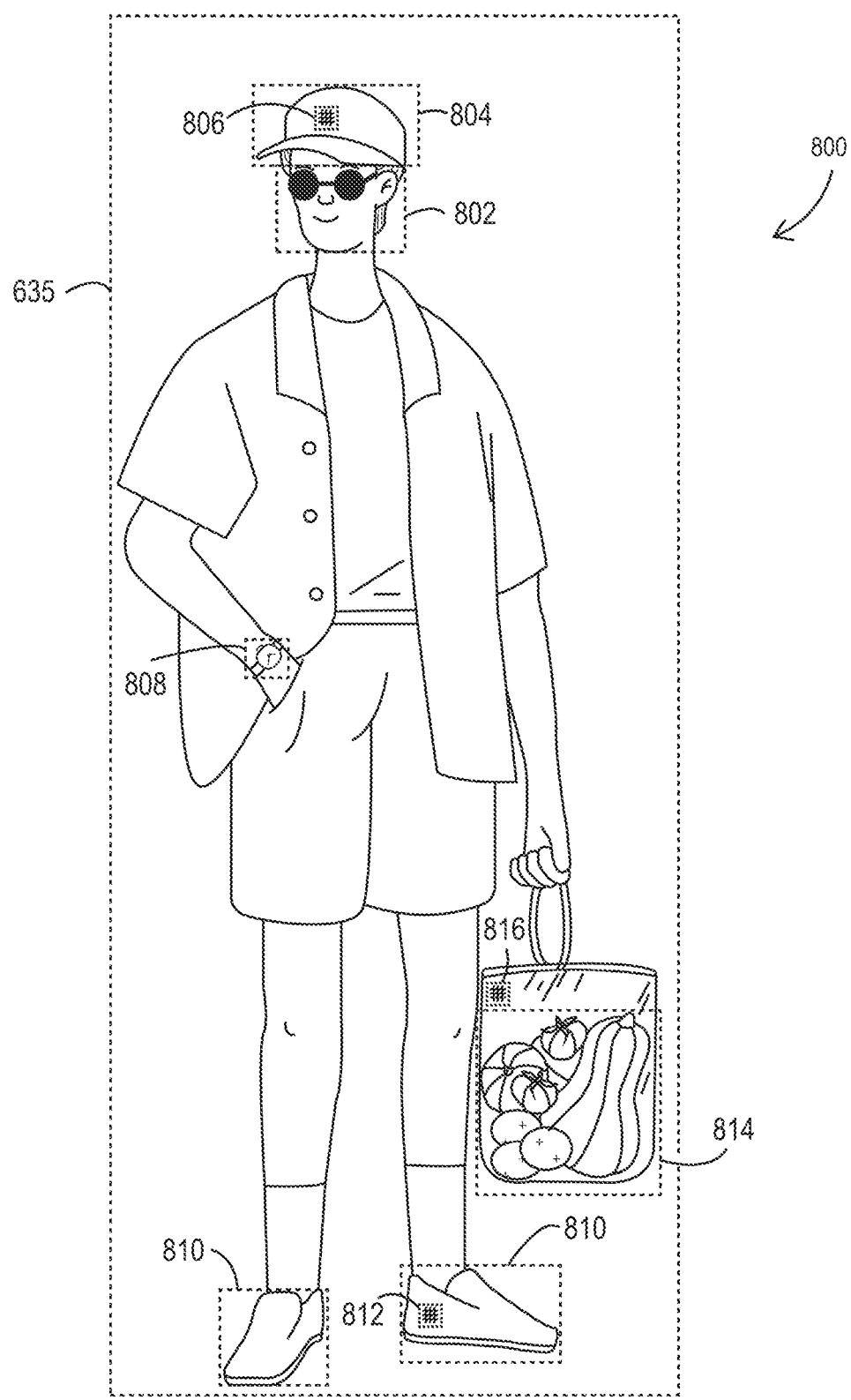
FIG. 8 is an image illustrating using AI to determine the context information of a target individual, according to various arrangements.

FIG. 8 is an image 800 illustrating using AI to determine the context information of the target individual 635, according to various arrangements. The context information of the target individual 645 can be likewise determined using similar methods. The image 800 can be a part of the image 600a/600b. The image 800 includes the selected target individual 635 with a bounding box enclosing the same. The image 800 can include various objects that can be detected using object detection, including a hat 804, a logo 806 of the hat 804, a watch 808, a pair of shoes 810, a logo 812 of the shoes 810, grocery 814 (e.g., vegetables), and a barcode 816 of the grocery 814. The AI 700c can determine external attributes 750 including that the hat 804 (with a bounding box) is a headwear, hat, baseball cap, and based on the shape of the hat 804 even a brand of the hat 804. The AI 700c can determine external attributes 750 including the logo 806 (with a bounding box) corresponding to the brand of the hat 804. The AI 700c can determine external attributes 750 including that the watch 808 (with a bounding box) is a wearable, watch, etc., and based on the shape of the watch 808, even a brand of the watch 808. The AI 700c can determine external attributes 750 including that the shoes 810 (with a bounding box) is a footwear, shoes, sneakers, and based on the shape of the shoes 810 even a brand of the shoes 810. The AI 700c can determine external attributes 750 including the logo 812 (with a bounding box) corresponding to the brand of the shoes 810. The AI 700c can determine external attributes 750 including that the grocery 814 (with a bounding box) is a food, vegetable, and the specific type of vegetable. The AI 700c can determine external attributes 750 including the barcode 816 (with a bounding box) corresponding to the specific type of the vegetables.

The AI 700c can implement any suitable algorithm for detecting the age, gender, height, weight, face, hair style, hair length, hair color, and so on of the target individual 635. For example, the hair style, hair length, hair color, and so on can be determined using the DNN such as CNNs implemented by OpenCV, Tensorflow, or another suitable AI system for image classification, where the class of interest includes the hair style, hair length, hair color, and so on. The AI 700c can also implement suitable AI models such as those included in the OpenCV to determine the age, gender, height, and weight of the target individual 635. The AI 700c can implement any suitable facial recognition system such as the Google AI to detect and store the face 802 of the target individual 635.

At 350, characteristics of each of the at least one target individual is determined based on the context information. For example, first characteristic of the first target individual is determined based on the first contextual information, and second characteristic of the second target individual is determined based on the second contextual information.

Figure 9:
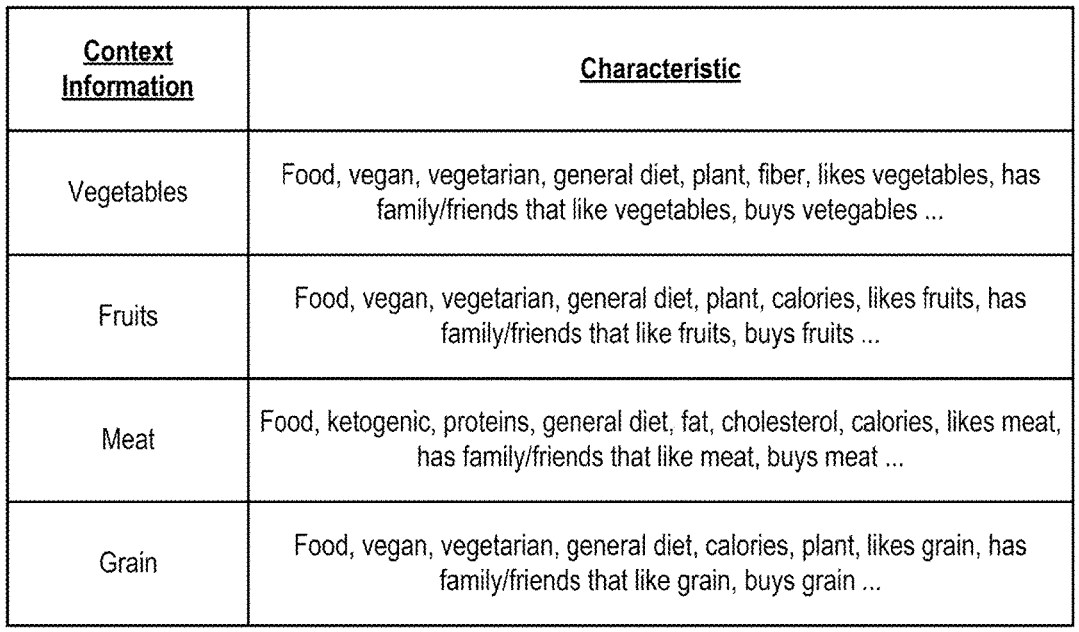
FIG. 9 shows a table illustrating an example mapping between the context information and the characteristics, according to various arrangements.

In some examples, the characteristic of a target individual can be determined based on predetermined mapping between the context information and the characteristics. The mapping can be stored in a suitable database such as the database 160 or a database local to the mobile platform system 110. FIG. 9 shows a table 900 illustrating an example mapping between the context information and the characteristics, according to various arrangements. For example, the context information of vegetables can be mapped to one or more of food, vegan, vegetarian, general diet, plant, fiber, likes vegetables, has family/friends that like vegetables, buys vegetables and so on. The context information of fruits can be mapped to one or more of food, vegan, vegetarian, general diet, calories, plant, likes fruits, has family/friends that like fruits, buys fruits, and so on. The context information of meat can be mapped to one or more of food, ketogenic, proteins, general diet, fat, cholesterol, calories, likes meat, has family/friends that like meat, buys meat, and so on. The context information of grain can be mapped to one or more of food, ketogenic, proteins, general diet, fat, cholesterol, calories, plant, likes grain, has family/friends that like grain, buys grain, and so on.

FIG. 7D is a diagram illustrating a method for determining characteristic 770 of each target individual, according to various arrangements. In some examples, the output analysis circuit 136 can implement AI 700d, where the input to the AI 700d includes the context information (e.g., 740, 750, and 760), and the output from the AI 700d includes characteristic 770. The AI 700d can include a classifier that classifies the context information into one or more characteristics such as those shown in the table 900. The AI 700d can include a classifier is a kernel-based classifier, such as but not limited to a SVM, SR-KDA, DNN, CNN, and so on that can be trained and further trained by the AI training system 170 using training input data (e.g., training context information) and provide supervised or unsupervised learning.

FIG. 7E is a diagram illustrating a method for determining characteristic 770 of each target individual, according to various arrangements. In some examples, the output analysis circuit 136 can implement AI 700e, where the input to the AI 700e includes the image/video 710, and the output from the AI 700e includes characteristic 770. The AI 700e can include a classifier that classifies the image/video 710 into one or more characteristics for each target individual such as those shown in the table 900. The AI 700e can include a classifier is a kernel-based classifier, such as but not limited to a SVM, SR-KDA, DNN, CNN, and so on that can be trained and further trained by the AI training system 170 using training input data (e.g., training images and videos) and provide supervised or unsupervised learning to the output characteristic 770. The AI 700e can produce a resulting characteristic 700 directly from the image and videos, which may conserve processing power. On the other hand, although the AI 700c and 700d/mapping in table 900 can arrive at the characteristics 770 using a two-step process, the AI 700c and 700d/mapping in table 900 allow updates to the association between the context information and the characteristic 770 to be flexibility provided. For example, the trained models of the AI 700d may be updated based on new training data and/or feedback from the target individual as described herein. The mapping in the table 900 may also be updated.

At 360, at least one multimedia content segment can be determined based on the characteristics of each of the at least one target individual. For example, the plurality of multimedia content segments are stored in the database 140. Each of the plurality of multimedia content segments includes one or more or a plurality of tags. Determining the at least one multimedia content segment includes selecting at least one multimedia content segment includes selecting the at least one multimedia content segment by matching first characteristic and second characteristic to the plurality of tags.

Figure 10:
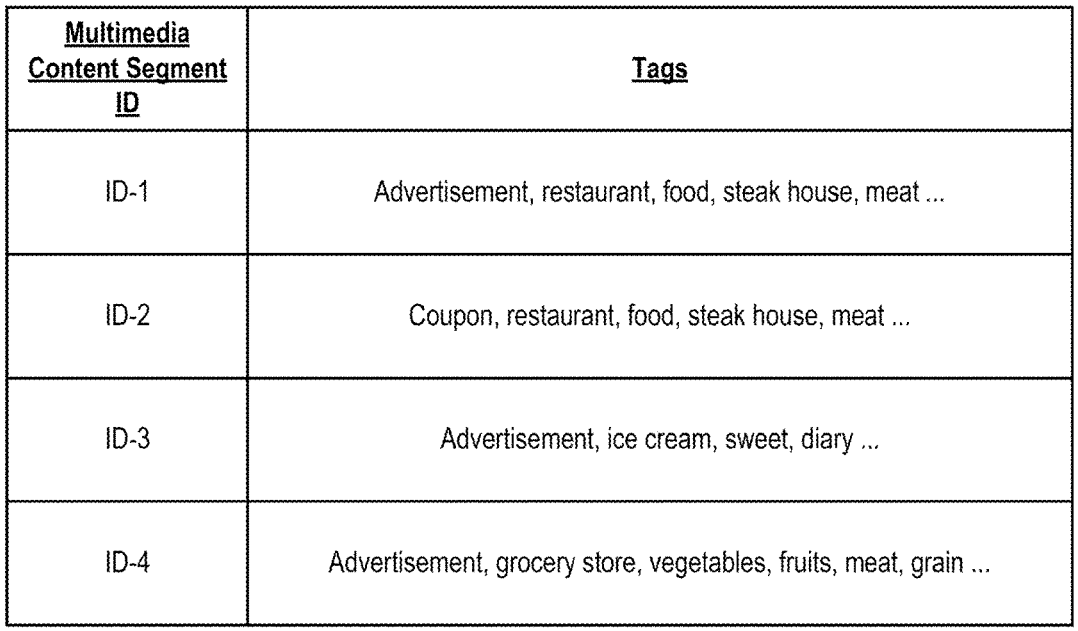
FIG. 10 is a table illustrating an example mapping between multimedia content segment ID and tags, according to various arrangements.

In some examples, the multimedia content selection system 138 can select one or more multimedia content segment based on a mapping table between a multimedia content segment Identifier (ID) and tags. FIG. 10 is a table 1000 illustrating an example mapping between multimedia content segment ID and tags, according to various arrangements. As shown in the table 1000, multimedia content segment (e.g., a video clip) ID-1 is associated with tags advertisement, restaurant, food, steak house, meat and so on. The multimedia content segment ID-2 is associated with tags coupon, restaurant, food, steak house, meat and so on. The multimedia content segment ID-3 is associated with tags advertisement, ice cream, sweet, diary, and so on. The multimedia content segment ID-4 is associated with tags advertisement, grocery store, vegetables, fruits, meat, grain, and so on. The multimedia content selection system 138 can compare the characteristic of the target individual with the tags of the multimedia content segments. The multimedia content segment ID with one or more tags that matches one or more characteristics of the target individual is selected. For example, in response to determining that the characteristics 770 of the target individual 635 includes vegetables, the multimedia content selection system 138 can select multimedia content segment ID-4 as the tags of multimedia content segment ID-4 includes vegetables. The multimedia content segment with ID-4 can be an advertisement video on a grocery store that sells groceries, including the vegetables. In some examples, the multimedia content segment ID can be mapped directly to characteristics, which may be the same as the tags.

In some examples, at least one multimedia content segment can be determined based on the characteristics of multiple target individuals (e.g., both the first characteristic of the first target individual and the second characteristic of the second target individual). In some examples, the multimedia content segment ID having a tag that corresponds or matches to a characteristic 770 common to both the target individual 635 and the target individual 645 is selected. For instance, in response to determining that the characteristics 770 of both the target individual 635 and the target individual 645 includes vegetables, the multimedia content selection system 138 can select multimedia content segment ID-4 as the tags of multimedia content segment ID-4 includes vegetables. In some examples, the multimedia content segment ID having two tag, with one tag corresponding or matching a characteristic 770 of the target individual 635 and another tag corresponding or matching a characteristic 770 of the target individual 645, is selected. For instance, in response to determining that the characteristics 770 of the target individual 635 includes vegetables and that the characteristics 770 of the target individual 645 includes fruits, the multimedia content selection system 138 can select multimedia content segment ID-4 as the tags of multimedia content segment ID-4 includes both vegetables and fruits.

At 370, the output device of the mobile platform system displays, while the mobile platform system is in a stop mode, the at least one multimedia content segment. For example, the output device 142 can display the at least one selected multimedia content segment with the corresponding multimedia content segment ID(s). The same multimedia content segment can be displayed to multiple target individuals in some examples. In some examples, multiple multimedia content segments selected for multiple target individuals can be displayed using a same output device or different output devices.

Figure 11A:
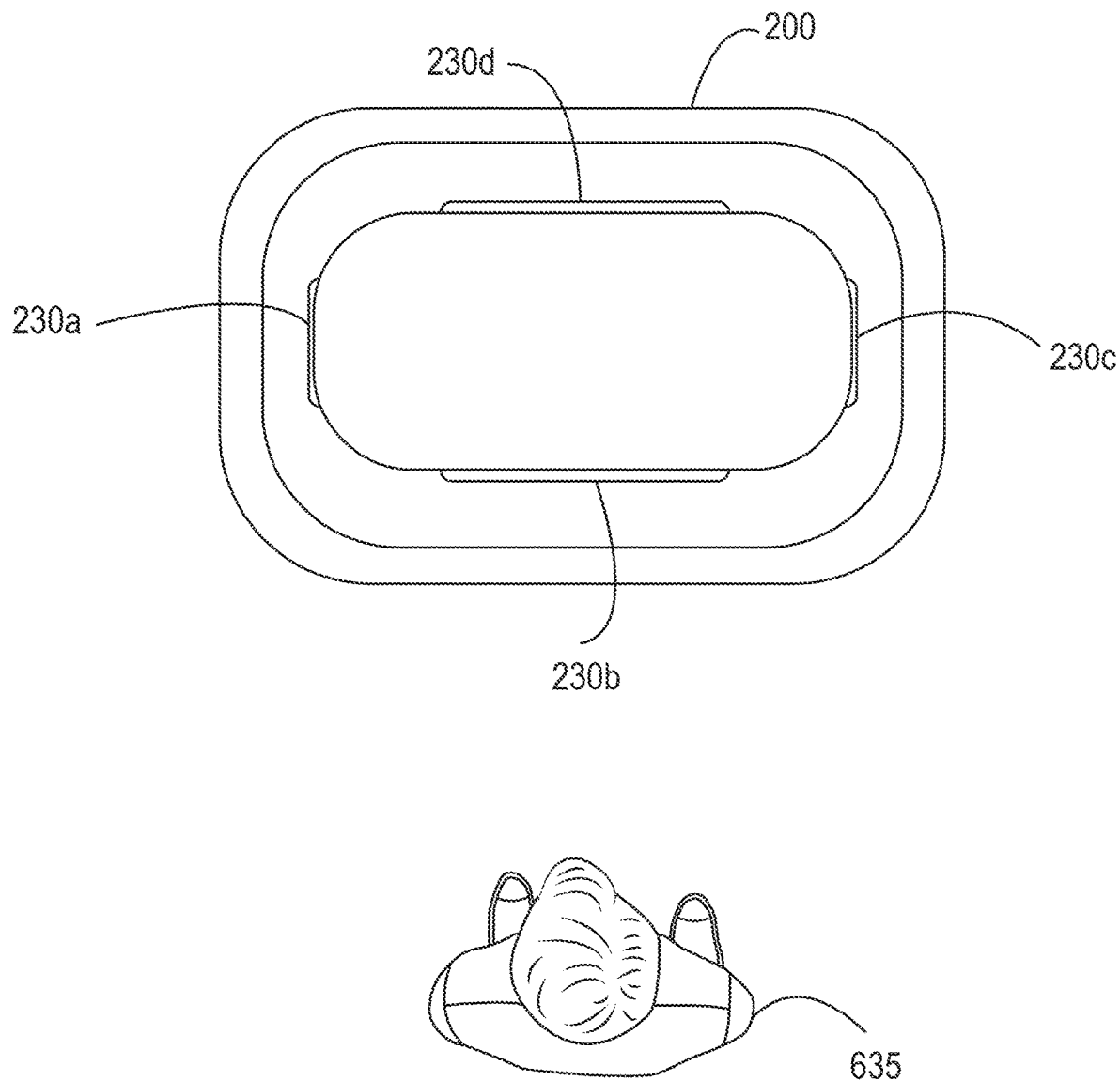
FIG. 11A is a diagram illustrating the mobile platform system and the target individual, according to some arrangements.

FIG. 11A is a diagram illustrating the mobile platform system 200 and the target individual 635, according to some arrangements. In the example in which one multimedia content segment is to be displayed to one target individual (e.g., the target individual 635), the output device 142 can display the multimedia content segment in one of multiple displays (e.g., the touchscreens 230a, 230b, 230c, and 230d) closest to the target individual 635, which is the touchscreen 230a. In the example in which the camera 24a that is located adjacent to the touchscreen 230a is capturing currently an image or a video of the target individual 635, the multimedia content segment is displayed on the touchscreen 230a that is closest to the camera 240a.

FIG. 11B is a diagram illustrating the mobile platform system 200 and the target individuals 635 and 645, according to some arrangements. In the example in which one multimedia content segment is to be displayed to two target individuals (e.g., the target individuals 635 and 645), the output device 142 can display the multimedia content segment in one of multiple displays (e.g., the touchscreens 230a, 230b, 230c, and 230d) closest to both the target individuals 635 and 645. In the example in which the camera 240a that is located adjacent to the display (e.g., the touchscreen 230a) is capturing currently an image or a video of both the target individuals 635 and 645, the multimedia content segment is displayed on the touchscreen 230a that is closest to the camera 240a. In such examples, the controller 114 can drive the locomotion device 116 or rotate the upper portion 220 using the middle portion 215 to orient the touchscreen 230a and the camera 230a to face and to continuously face both the target individuals 635 and 645 when displaying the multimedia content segment. That is, the controller 114 can position (reposition) and orient (reorient) the mobile platform system 110 so that the camera 240a that is located adjacent to the touchscreen 230a that is displaying the multimedia content segment continues both the target individuals 635 and 645. For instance, a visual center of the image or video frame outputted by touchscreen 230a is aimed at an area between the target individuals 635 and 645.

Figure 11C:
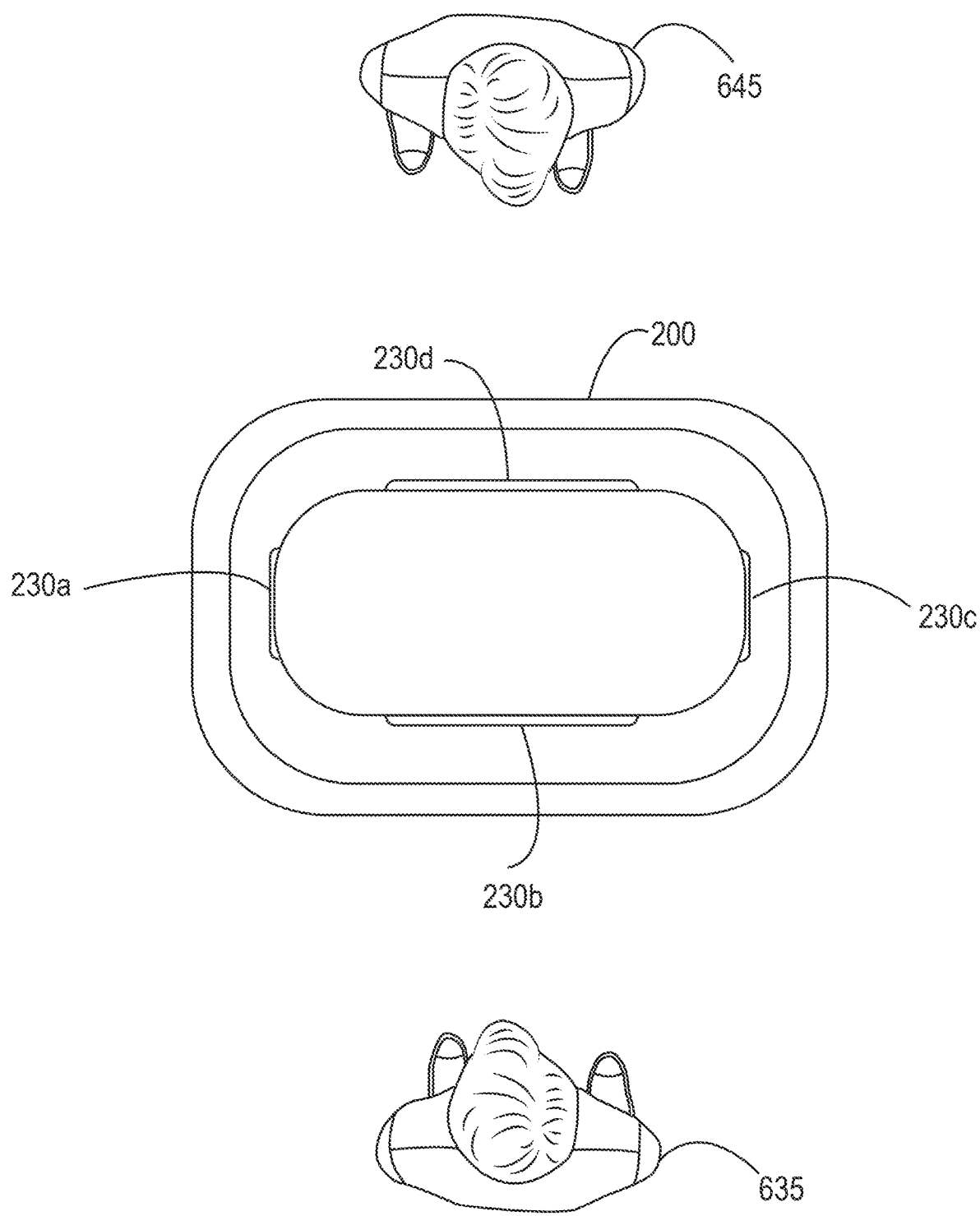
FIG. 11C is a diagram illustrating the mobile platform system and the target individuals, according to some arrangements.

FIG. 11C is a diagram illustrating the mobile platform system 200 and the target individuals 635 and 645, according to some arrangements. In the example in which one multimedia content segment is to be displayed to two target individuals (e.g., the target individuals 635 and 645), the output device 142 can display the multimedia content segment in two displays (e.g., touchscreens 230a and 230c) closest to the target individuals 635 and 645, respectively. In the example in which a first camera 240a that is located adjacent to a first display (e.g., the touchscreen 230a) is capturing currently an image or a video of the target individual 635 and a second camera (not shown in view) that is located adjacent to a second display (e.g., the touchscreen 230c) is capturing currently an image or a video of the target individual 645, the multimedia content segment is displayed on both the first and second displays (e.g., the touchscreens 230a and 230c) that are closest to the first and second cameras, respectively.

In the example, multiple (e.g., two) different multimedia content segments are to be displayed to two target individuals (e.g., the target individuals 635 and 645). In the example in which a first camera 240a that is located adjacent to a first display (e.g., the touchscreen 230a) is capturing currently an image or a video of the target individual 635 and a second camera that is located adjacent to a second display (e.g., the touchscreen 230c) is capturing currently an image or a video of the target individual 645, a first multimedia content segment is displayed in the first display (e.g., the touchscreen 230a) closest to the target individual 635 and the second multimedia content segment in the second display (e.g., the touchscreen 230c) closest to the target individual 645.

As shown in FIG. 11B, the controller 114 may drive the locomotion device 116 to a position such that the camera 240a can capture both the first and second target individuals 635 and 645, in response to selecting the first and second target individuals 635 and 645. As shown in FIG. 11C, the controller 114 may drive the locomotion device 116 to a position between the first and second target individuals 635 and 645, such that the camera 240a can capture the first target individual 635 and the camera adjacent to the touchscreen 230c can capture the second target individual 645, in response to selecting the first and second target individuals 635 and 645.

FIG. 7F is a diagram illustrating a method for determining multimedia content segment ID 780, according to various arrangements. In some examples, the multimedia selection system 138 can implement AI 700f, where the input to the AI 700f includes the image/video 710, and the output from the AI 700f includes at least one multimedia content segment ID 780. The AI 700f can include a classifier that classifies the image/video 710 into at least one multimedia content segment ID 780 such as those shown in the table 1000. The AI 700f can include a classifier is a kernel-based classifier, such as but not limited to a SVM, SR-KDA, DNN, CNN, and so on that can be trained and further trained by the AI training system 170 using training input data (e.g., training images and videos) and provide supervised or unsupervised learning to the output multimedia content segment ID 780. The AI 700*f* can produce at least one multimedia content segment ID 780 directly from the image and videos, which may conserve processing power. On the other hand, using one or more of the AIs 700*a*, 700*b*, 700*c*, 700*d*, 700*e*, the mapping in table 900, and the mapping in table 1000 allow updates to the association among the context information, the characteristic 770, and multimedia content segment ID 780 to be flexibility provided.

In some examples, the mobile platform system 110 can display the at least one multimedia content segment while following one or more selected target individuals for a period of time. For example, the controller 114 can drive the locomotion device 116 to move the mobile platform system in a follow mode toward or following one or more selected target individuals by moving in a direction in which the camera capturing the one or more selected target individuals is pointing and adjust the direction in order to maintain the one or more target individuals within the FoV, image, or video frame of that camera. The period of time can be a predetermined time interval (e.g., 5 seconds, 10 seconds, 20 seconds, and so on). In some examples, the mobile platform system 110 can follow an individual with certain physical attributes 740 (e.g., an individual in a certain age group such as children), external attributes 750 (e.g., an individual wearing a hate), purchased item 760 (e.g., an individual holding groceries), or characteristic 770 (e.g., vegetables). In some examples, the mobile platform system 110 can follow the at least one selected target individual as long as an AI implemented by the output analysis circuit 136 can detect that the at least one selected target individual is looking at the display adjacent to the camera capturing the at least one selected target individual. For example, the output analysis circuit 136 can employ suitable eye-tracking algorithms to analyze the video and images outputted by the camera 132 to determine the location where the eyes of the selected target individual are looking.

At 380, the mobile platform system can receive feedback information and metadata associated with the feedback information using the input device 148. The feedback information can be from or related to any of the selected at least one target individual (e.g., at least one of the first target individual or the second target individual). At 390, the mobile platform system can use the feedback information as well as the metadata associated with the feedback information as training data for one or more of the AIs 700*a*, 700*b*, 700*c*, 700*d*, 700*e*, or 700*f* implemented by the output analysis circuit 136 or the multimedia selection system 138. In some arrangements, the AI training system 170 can compute an engagement score based on the feedback information and the metadata, and train the one or more of the AIs 700*a*, 700*b*, 700*c*, 700*d*, 700*e*, or 700*f* using the engagement score in a feedback loop. The engagement score corresponds to the label of the previously outputted AI generated results. In some examples, the trained models of the one or more of the AIs 700*a*, 700*b*, 700*c*, 700*d*, 700*e*, or 700*f*

For example, a target individual who has viewed at least a part of a displayed multimedia content segment can provide the input using the input device 148. For example, a target individual can input whether the target individual likes or dislikes the displayed multimedia content segment using the input device 148 (e.g., the touchscreen). In some examples, the target individual can, using the input device 148 (e.g., the touchscreen), pause or stop the displayed multimedia content before the multimedia content ends. In some examples, the target individual can, using the input device 148 (e.g., the touchscreen), choose to claim or interact coupons, discounts, offers, and promotions, displayed as user interactive elements overlaid or next to the displayed multimedia content segment. Pausing or stopping the displayed multimedia content before the multimedia content ends, indicating dislike, or not claiming or interacting with the coupons, discounts, offers, and promotions correspond to a low score $X1$, whereas not pausing or stopping the displayed multimedia content before the multimedia content ends, indicating like, or claiming or interacting with the coupons, discounts, offers, and promotions correspond to a high score $X1$. The metadata associated with such user input includes the length of time the multimedia content segment is allowed to be played before the target individual uses the input device 148 to indicate that he or she likes or dislikes the displayed multimedia content segment, to pause or stop the displayed multimedia content segment, to claim or interact with the coupons, discounts, offers, and promotions. A shorter length of time that the multimedia content segment is allowed to be played corresponds to a low score $Y1$ while a longer length of time corresponds to a high score $Y1$. In some examples, the metadata associated with such user input includes the distance between the target individual and the mobile platform system 110 determined in the manner described herein. The longer the distance between the target individual and the mobile platform system 110 corresponds to a low score $Z1$ while the shorter the distance between the target individual and the mobile platform system 110 corresponds to a high score $Z1$. A first engagement score for the explicit input of the target individual can be one of 1) $X1$; 2) $Y1$, 3) $Z1$, 4) a sum of $X1$ and either or both of $Y1$ and $Z1$; 5) a product of $X1$ and either or both of $Y1$ and $Z1$, or so on.

In some example, the feedback can be implicitly inferred. In some examples, the camera 132 can provide images and videos based on which the output analysis system 138 can determine that a target individual has walked away (moved away from the FoV of the camera adjacent to the display displaying the multimedia content segment). Walking away from the mobile platform system 110 before the multimedia content ends corresponds to a low score $X2$, whereas not walking away from the mobile platform system 110 before the multimedia content ends corresponds to a high score $X2$. In some examples, the camera 132 can provide images and videos based on which the output analysis system 138 can determine that a target individual is looking at the display adjacent to the camera capturing the at least one selected target individual (e.g., using a suitable eye-tracking algorithm as described herein. Failing to look at the display corresponds to a low score $Y2$, whereas looking at the display corresponds to a high score $Y2$. The metadata associated with such implicit inference includes the length of time the multimedia content segment is allowed to be played before the target individual walks away or looks away. A shorter length of time that the multimedia content segment is played corresponds to a low score $Y2$ while a longer length of time corresponds to a high score $Y2$. In some examples, the metadata associated with such user input includes the distance between the target individual and the mobile platform system 110 determined in the manner described herein. The longer the distance between the target individual and the mobile platform system 110 when the target individual is looking at the display and before walking away corresponds to a low score $Z2$ while the shorter the distance between the target individual and the mobile platform system 110 when the target individual is looking at the display and before walking away corresponds to a high score $Z2$. A second engagement score for the explicit input of the target individual can be one of 1) X2; 2) Y2, 3) Z2, 4) a sum of X2 and either or both of Y2 and Z2; 5) a product of X2 and either or both of Y2 and Z2, or so on.

The overall engagement score can be the first engagement score, the second engagement score, or a combination of both the first engagement score and the second engagement score (e.g., a sum or product thereof). The training system 170 can generated a feedback loop by assembling a training data set including 1) the outputs 720, 740, 750, 760, 770, or 780 to the AIs 700*a*, 700*b*, 700*c*, 700*d*, 700*e*, or 700*f;* 2) the input 710, 740, 750, or 760 to the AIs 700*a*, 700*b*, 700*c*, 700*d*, 700*e*, or 700*f* that resulted in the outputs; and the 3) overall engagement score. The engagement scores function as labels to the inputs and outputs to all the AIs 700*a*, 700*b*, 700*c*, 700*d*, 700*e*, or 700*f* to validate or invalidate the decisions of the AIs. Low engagement scores indicate low engagement by the selected target individuals, thus further indicating inappropriate or inaccurate selection of one or more of the identified individuals 720, physical attributes 740, external attributes 750, purchased item 760, characteristics 770, or the multimedia content segment ID 780. The AIs 700*a*, 700*b*, 700*c*, 700*d*, 700*e*, or 700*f* can update the developed models based on the engagement score, where substantial changes to the developed models can occur in view of low engagement scores, and insignificant or no changes to the developed models can occur in view of low engagement scores.

In some examples, additional metadata such as time of day, date, the position of the mobile platform system 110, and so on can be used to further train one or more of the AIs 700*a*, 700*b*, 700*c*, 700*d*, 700*e*, or 700*f* to provide context for the engagement score. Given that based on the time of day, date, and the position of the mobile platform system 110, the same individual may make different decisions to engage with the displayed content. For example, during work hours on a work day in a position of a crowded area (e.g., office building lobby) may influence low engagement with an individual as compared to during afternoon hours on a weekend in a position of a less crowded area (e.g., a mall). Thus, the training system 170 can generated a feedback loop by assembling a training data set including 1) the outputs 720, 740, 750, 760, 770, or 780 to the AIs 700*a*, 700*b*, 700*c*, 700*d*, 700*e*, or 700*f;* 2) the input 710, 740, 750, or 760 to the AIs 700*a*, 700*b*, 700*c*, 700*d*, 700*e*, or 700*f* that resulted in the outputs; the 3) overall engagement score; 4) time of day; 5) date; and 6) position of the mobile platform system 110.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA), Graphics Processing Unit (GPU), or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system, comprising:
   a camera;
   an output device;
   a locomotion system; and
   a processing circuit comprising a processor and a memory, wherein the processing circuit is configured to:
   move a mobile platform system using the locomotion system in a cruise mode within an area;
   determine, using a camera of the mobile platform system, image or video data of a plurality of individuals within the area while moving in the cruise mode;
   select a first target individual and a second target individual of the plurality of individuals based on analyzing the image or video data;
   determine first contextual information of the first target individual and second contextual information of the second target individual based on analyzing the image or video data;
   determine first characteristic of the first target individual based on the first contextual information and second characteristic of the second target individual based on the second contextual information;
   determine at least one multimedia content segment based on both the first characteristic of the first target individual and the second characteristic of the second target individual; and
   cause an output device of the mobile platform system to display while the mobile platform system is in a stop mode, the at least one multimedia content segment.

2. The system of claim 1, wherein moving in the cruise mode within the area comprises:
   moving the mobile platform system on a first path within the area during a first time interval;
   moving the mobile platform system on a second path within the area during a second time interval, wherein at least one location along the first path is different from any location on the second path; and
   in response to selecting the first target individual and the second target individual, moving the mobile platform system in an approach mode toward the first target individual and the second target individual.

3. The system of claim 1, wherein
   the camera of mobile platform system comprises a plurality of cameras facing different directions; and
   determining the image or video data of the plurality of individuals within the area while moving in the cruise mode comprises capturing, by the plurality of cameras, the image or video data of the plurality of individuals within the area while moving in the cruise mode, wherein the first target individual of the plurality of individuals is captured by a first camera of the plurality of cameras, and the second target individual of the plurality of individuals is captured by a second camera of the plurality of cameras.

4. A system, comprising:
   a vision system comprising:
      a camera;
      at least one Artificial Intelligence (AI);
      an AI training system;
   an input device;
   an output device;
   a processing circuit comprising a processor and a memory, the processing circuit implementing the AI, the AI training system, and the processing circuit is configured to:
   determine, using the camera, image or video data of a plurality of individuals within an area;
   select a first target individual and a second target individual of the plurality of individuals based on analyzing the image or video data;
   determine first contextual information of the first target individual and second contextual information of the second target individual based on analyzing the image or video data;
   determine first characteristic of the first target individual based on the first contextual information and second characteristic of the second target individual based on the second contextual information;
   determine at least one multimedia content segment based on both the first characteristic of the first target individual and the second characteristic of the second target individual;
   cause an output device of the mobile platform system to display, the at least one multimedia content segment;
   receive feedback information using the input device of the mobile platform system; and
   using the feedback information and metadata associated with the feedback information as training data to train the at least one AI.

5. The system of claim 4, wherein the metadata comprises:
   a length of time associated with the feedback information;
   a distance between the mobile platform system with each of the first target individual or the second target individual.

6. The system of claim 5, wherein the metadata comprises:
   a time of day;
   a date; and
   a location of the mobile platform system.

7. The system of claim 4, wherein the feedback information further comprises each of the first target individual or the second target individual walking away from the mobile platform system as determined based on analyzing the image or video data.

8. The system of claim 4, wherein the feedback information further comprises each of the first target individual or the second target individual is looking at the at least one multimedia content segment as determined based on analyzing the image or video data.

9. A method, comprising:
moving a mobile platform system in a cruise mode within an area;
determine, by a camera of the mobile platform system, image or video data of a plurality of individuals within the area while moving in the cruise mode;
selecting a first target individual and a second target individual of the plurality of individuals based on analyzing the image or video data, the first target individual and the second target individual are selected using a first Artificial Intelligence (AI) with a first input of the image or video data;
determining first contextual information of the first target individual and second contextual information of the second target individual based on analyzing the image or video data, the first contextual information and the second contextual information are determined using a second AI with a second input of the image or video data;
determining first characteristic of the first target individual based on the first contextual information and second characteristic of the second target individual based on the second contextual information, the first characteristic and the second characteristic are determined using a third AI using a third input of the first contextual information and the second contextual information, respectively;
determining at least one multimedia content segment based on both the first characteristic of the first target individual and the second characteristic of the second target individual;
displaying, by an output device of the mobile platform system while the mobile platform system is in a stop mode, the at least one multimedia content segment;
receiving feedback information using an input device of the mobile platform system; and
using the feedback information and metadata associated with the feedback information as training data to train the first AI, the second AI, and the third AI.

10. The method of claim 9, wherein moving in the cruise mode within the area comprises moving the mobile platform system on a predetermined path within the area.

11. The method of claim 9, wherein moving in the cruise mode within the area comprises
moving the mobile platform system on a first path within the area during a first time interval;
moving the mobile platform system on a second path within the area during a second time interval, wherein at least one location along the first path is different from any location on the second path.

12. The method of claim 9, comprising in response to selecting the first target individual and the second target individual, moving the mobile platform system in an approach mode toward the first target individual and the second target individual.

13. The method of claim 9, wherein
the camera of mobile platform system comprises a plurality of cameras facing different directions; and
capturing the image or video data of the plurality of individuals within the area while moving in the cruise mode comprises capturing, by the plurality of cameras, the image or video data of the plurality of individuals within the area while moving in the cruise mode, wherein the first target individual of the plurality of individuals is captured by a first camera of the plurality of cameras, and the second target individual of the plurality of individuals is captured by a second camera of the plurality of cameras.

14. The method of claim 9, wherein
the output device comprises a display;
the method comprising orienting the display to face both the first target individual and the second target individual when displaying the at least one multimedia content segment.

15. The method of claim 9, wherein
the first contextual information of the first target individual comprises at least one of physical attributes of the first target individual, external attributes of the first target individual, and purchased item of the first individual as captured in the image or video data; and
the second contextual information of the first second individual comprises at least one of physical attributes of the second target individual, external attributes of the second target individual, and purchased item of the second individual as captured in the image or video data.

16. The method of claim 9, comprising storing a plurality of multimedia content segments in a database, wherein each of the plurality of multimedia content segments comprises a plurality of tags, wherein determining the at least one multimedia content segment comprises selecting the at least one multimedia content segment by matching first characteristic and second characteristic to the plurality of tags.

17. The method of claim 9, wherein the metadata comprises:
a length of time associated with the feedback information;
a distance between the mobile platform system with each of the first target individual or the second target individual.

18. The method of claim 17, wherein the metadata comprises:
a time of day;
a date; and
a location of the mobile platform system.

19. The method of claim 9, wherein the feedback information further comprises each of the first target individual or the second target individual walking away from the mobile platform system as determined based on analyzing the image or video data.

20. The method of claim 9, wherein the feedback information further comprises each of the first target individual or the second target individual is looking at the at least one multimedia content segment as determined based on analyzing the image or video data.

* * * * *